(12) United States Patent
Kitaguchi

(10) Patent No.: US 11,067,007 B2
(45) Date of Patent: Jul. 20, 2021

(54) GAS TURBINE AND METHOD FOR OPERATING GAS TURBINE

(71) Applicant: Mitsubishi Hitachi Power Systems, Ltd., Kanagawa (JP)

(72) Inventor: Yoshinori Kitaguchi, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 165 days.

(21) Appl. No.: 16/316,263

(22) PCT Filed: May 12, 2017

(86) PCT No.: PCT/JP2017/018108
§ 371 (c)(1),
(2) Date: Jan. 8, 2019

(87) PCT Pub. No.: WO2018/012100
PCT Pub. Date: Jan. 18, 2018

(65) Prior Publication Data
US 2019/0153963 A1     May 23, 2019

(30) Foreign Application Priority Data

Jul. 11, 2016   (JP) .............................. JP2016-136941

(51) Int. Cl.
*F02C 9/28*        (2006.01)
*F02C 7/26*        (2006.01)
(Continued)

(52) U.S. Cl.
CPC ................. *F02C 9/28* (2013.01); *F02C 6/08* (2013.01); *F02C 7/26* (2013.01); *F02C 9/18* (2013.01);
(Continued)

(58) Field of Classification Search
CPC ...... F02C 6/08; F02C 9/18; F02C 9/52; F02C 7/26; F05D 2260/601; F05D 2260/606;
(Continued)

(56) References Cited

U.S. PATENT DOCUMENTS 6,059,522 A  *  5/2000  Gertz ..................... F02C 7/057
                                                        415/1
6,550,253 B2 *  4/2003  Mortzheim ........... F01D 17/105
                                                        60/782
(Continued)

FOREIGN PATENT DOCUMENTS

CN      101059102      10/2007
CN      102128086      7/2011
(Continued)

OTHER PUBLICATIONS

Office Action dated Jun. 3, 2020 in corresponding Chinese Patent Application No. 201780039215.6, with English Translation.
(Continued)

*Primary Examiner* — Alain Chau
(74) *Attorney, Agent, or Firm* — Wenderoth, Lind & Ponack, L.L.P.

(57) ABSTRACT

A gas turbine is equipped with: a low-pressure bleed passage, a medium-pressure bleed passage, and a high-pressure bleed-passage for supplying compressed air bled from respective bleed chambers to a turbine; a low-pressure exhaust passage, a medium-pressure exhaust passage, and a high-pressure exhaust passage for exhausting the compressed air in the respective bleed passages to an exhaust chamber; a low-pressure exhaust valve, a medium-pressure exhaust valve, and a high-pressure exhaust valve provided respectively in the exhaust passages; a low-pressure ejector and a medium-pressure ejector provided in the respective exhaust passages; a driving air supply passage for supplying the compressed air to the ejectors; and a control device
(Continued)

configured to open the exhaust valves and supply compressed air from the driving air supply passage to the ejectors when an operating state of a gas turbine is in a region in which rotation stall is generated.

11 Claims, 8 Drawing Sheets

(51) Int. Cl.
*F02C 9/18* (2006.01)
*F04D 27/02* (2006.01)
*F02C 6/08* (2006.01)

(52) U.S. Cl.
CPC ....... *F04D 27/023* (2013.01); *F04D 27/0215* (2013.01); *F04D 27/0284* (2013.01); *F05D 2260/601* (2013.01); *F05D 2260/85* (2013.01); *F05D 2270/101* (2013.01)

(58) Field of Classification Search
CPC ............. F05D 2260/85; F05D 2270/10; F05D 2270/101; F04D 27/0215; F04D 27/023
See application file for complete search history.

(56) References Cited

U.S. PATENT DOCUMENTS

| | | | | |
|---|---|---|---|---|
| 6,615,574 | B1* | 9/2003 | Marks | F02C 7/18 60/772 |
| 6,782,703 | B2* | 8/2004 | Dovali-Solis | F02C 6/18 60/39.182 |
| 6,820,429 | B2* | 11/2004 | Meisner | F02C 9/28 60/39.27 |
| 7,536,864 | B2* | 5/2009 | Wolfe | F01D 17/105 60/782 |
| 7,861,536 | B2* | 1/2011 | Alecu | F02C 6/08 60/806 |
| 8,015,826 | B2* | 9/2011 | Myers | F02C 9/18 60/785 |
| 8,142,169 | B2* | 3/2012 | Whaling | F01D 25/12 417/189 |
| 8,302,407 | B2* | 11/2012 | Alecu | F01D 11/06 60/772 |
| 8,661,832 | B2* | 3/2014 | Griffin | F04D 27/0223 60/779 |
| 8,726,672 | B2* | 5/2014 | Ciofini | F01D 9/065 60/782 |
| 8,733,110 | B2* | 5/2014 | Weber | F01D 17/145 60/782 |
| 9,206,744 | B2* | 12/2015 | Maldonado | F01D 25/10 |
| 9,222,410 | B2* | 12/2015 | Chillar | F02C 6/18 |
| 9,260,974 | B2* | 2/2016 | Hasting | F01D 11/24 |
| 9,650,966 | B2* | 5/2017 | Sakamoto | F02C 9/18 |
| 9,863,285 | B2* | 1/2018 | Ekanayake | F02C 6/18 |
| 10,047,757 | B2* | 8/2018 | Srivastava | F04D 27/001 |
| 10,072,573 | B2* | 9/2018 | Klosinski | F01D 25/305 |
| 10,415,476 | B2* | 9/2019 | Klosinski | F02C 6/04 |
| 10,584,615 | B2* | 3/2020 | Scipio | F01K 17/025 |
| 2001/0022075 | A1* | 9/2001 | Mandai | F02C 7/18 60/786 |
| 2003/0046938 | A1 | 3/2003 | Mortzheim et al. | |
| 2004/0045300 | A1* | 3/2004 | Dovali-Solis | F01K 23/101 60/778 |
| 2007/0125092 | A1* | 6/2007 | Wolfe | F02C 7/18 60/782 |
| 2008/0115503 | A1* | 5/2008 | Vasquez | F04D 27/023 60/785 |
| 2008/0118371 | A1* | 5/2008 | Vasquez | F02C 6/08 417/77 |
| 2010/0170265 | A1* | 7/2010 | Whaling | F02C 3/32 60/785 |
| 2011/0056210 | A1* | 3/2011 | Griffin | F04D 27/0223 60/773 |
| 2011/0072827 | A1* | 3/2011 | Ciofini | F02C 7/12 60/772 |
| 2011/0162386 | A1 | 7/2011 | Chandrabose et al. | |
| 2012/0260667 | A1* | 10/2012 | Chillar | F02C 7/18 60/779 |
| 2014/0013765 | A1 | 1/2014 | Studerus et al. | |
| 2014/0053572 | A1* | 2/2014 | Sakamoto | F02C 6/08 60/785 |
| 2014/0072399 | A1* | 3/2014 | Maldonado | F02C 7/26 415/1 |
| 2015/0300266 | A1 | 10/2015 | Glahn et al. | |
| 2015/0322861 | A1* | 11/2015 | Scipio | F04F 5/54 60/773 |
| 2015/0322866 | A1* | 11/2015 | Scipio | F02C 9/18 415/116 |
| 2015/0361902 | A1* | 12/2015 | Napier | F04D 27/0238 60/785 |
| 2016/0271560 | A1* | 9/2016 | Ekanayake | F02C 9/18 |
| 2016/0273408 | A1* | 9/2016 | Ekanayake | F02C 6/08 |
| 2017/0074172 | A1* | 3/2017 | Little | F02C 6/08 |
| 2017/0167304 | A1* | 6/2017 | Scipio | F01K 23/10 |
| 2017/0167377 | A1* | 6/2017 | Klosinski | F02C 7/141 |
| 2017/0167380 | A1* | 6/2017 | Klosinski | F02C 3/34 |

FOREIGN PATENT DOCUMENTS

| | | |
|---|---|---|
| CN | 102705080 | 10/2012 |
| JP | 2008-196399 | 8/2008 |
| JP | 2011-137448 | 7/2011 |
| JP | 2014-20373 | 2/2014 |

OTHER PUBLICATIONS

Notification of Reason for Refusal dated Feb. 4, 2020 in corresponding Korean Patent Application No. 10-2019-7000639, with English Translation.
International Search Report dated Jul. 4, 2017 in International (PCT) Application No. PCT/JP2017/018108.

* cited by examiner

GAS TURBINE AND METHOD FOR OPERATING GAS TURBINE

TECHNICAL FIELD

The present invention relates to a gas turbine having a compressor, a combustor, and a turbine, and a method for operating the gas turbine.

BACKGROUND ART

A general gas turbine includes a compressor, a combustor, and a turbine. Then, air taken in through an air intake port is compressed by the compressor, thereby becoming high-temperature and high-pressure compressed air, and in the combustor, fuel is supplied to the compressed air and burns, whereby a high-temperature and high-pressure combustion gas (a working fluid) is obtained, and the turbine is driven by the combustion gas to drive a power generator connected to the turbine.

When the gas turbine is started, compressed air is secured by driving the compressor by drivingly rotating a rotor by a starting motor. When compressed air is generated in this compressor, a load on compressor blades increases, and thus a rotating stall (surging) occurs. If the rotating stall occurs, there is a case where a decrease in efficiency, blade vibration, and axial vibration occur simultaneously.

As a technique for preventing a rotating stall of a gas turbine, for example, there is a technique as disclosed in Japanese Unexamined Patent Application Publication No. 2014-020373. In the method and apparatus for controlling surging of a gas turbine engine disclosed in Japanese Unexamined Patent Application Publication No. 2014-020373, a bleed pipe for discharging compressed air compressed in a compressor to a turbine is provided, and at the time of start-up of a gas turbine, a valve provided in the bleed pipe is opened to discharge the compressed air bled from the bleed pipe to the turbine, so that the rotating stall at the time of the start-up is suppressed.

SUMMARY OF INVENTION

Technical Problem

In the gas turbine starting method of the related art described above, at the time of the start-up of the turbine, the compressed air bled from the compressor is discharged from the bleed pipe to the turbine. In this case, the compressed air bled from the compressor is sent to the turbine through the bleed pipe by a pressure difference between the compressor and the turbine. For this reason, as the bleed pipe, a pipe having a large diameter is needed, and thus there is a problem in that a pipe cost increases and a construction cost increases.

The present invention is to solve the problem described above and has an object to provide a gas turbine in which downsizing of an apparatus or a reduction in construction cost is achieved, and a method for operating the gas turbine.

Solution to Problem

In order to achieve the above object, according to an aspect of the present invention, there is provided a gas turbine which includes a compressor, a combustor, and a turbine, the gas turbine including: a bleed passage for supplying compressed air bled from the compressor to the turbine as cooling air; an exhaust passage for exhausting the compressed air in the bleed passage to a turbine exhaust system; an exhaust valve which is provided in the exhaust passage; an ejector which is provided further on the downstream side in a flow direction of the compressed air than the exhaust valve in the exhaust passage; a driving fluid supply device which supplies a driving fluid to the ejector; and a control device which opens the exhaust valve and operates the driving fluid supply device, at the time of start-up or stopping of the gas turbine.

Therefore, for example, when the gas turbine is started, air is compressed by driving the compressor with a starting motor, and compressed air flows to the combustor side. However, at this time, a load on compressor blades in the compressor increases, and thus there is a concern that a rotating stall may occur. For this reason, at the time of start-up or stopping of the gas turbine, the exhaust valve is opened and the driving fluid supply device is operated to operate the ejector. Then, some of the compressed air bled from the compressor passes through the exhaust passage from the bleed passage, is increased in speed by the ejector, and is then exhausted to the turbine exhaust system. For this reason, the load on the compressor blades is reduced, and thus the occurrence of the rotating stall is suppressed, so that the operating characteristics of the gas turbine can be improved. Further, the bled compressed air can be exhausted to the turbine exhaust system at an early stage and in an increased amount due to the ejector, so that it is possible to downsize the apparatus or reduce the construction cost.

In the gas turbine according to the above aspect of the present invention, the control device opens the exhaust valve and operates the driving fluid supply device, when an operating state of the gas turbine is in a region where a rotating stall occurs.

Therefore, when the operating state of the gas turbine is in a region reaching the region where the rotating stall occurs, the exhaust valve is opened and the driving fluid supply device is operated to operate the ejector, whereby the load on the compressor blades is reduced, and thus the occurrence of the rotating stall is suppressed, so that the operating characteristics of the gas turbine can be improved. Further, the bled compressed air can be exhausted to the turbine exhaust system at an early stage and in an increased amount due to the ejector, so that it is possible to downsize the apparatus or reduce the construction cost.

In the gas turbine according to the above aspect of the present invention, the control device opens the exhaust valve and operates the driving fluid supply device, at the time of the start-up of the gas turbine, and closes the exhaust valve and stops an operation of the driving fluid supply device, if a start-up state of the gas turbine comes out of a region where a rotating stall occurs.

Therefore, when the gas turbine is started, there is a concern that the rotating stall may occur, and therefore, the exhaust valve is opened and the driving fluid supply device is operated to exhaust some of the compressed air bled from the compressor to the turbine exhaust system. For this reason, the load on the compressor blades is reduced, and thus the occurrence of the rotating stall is suppressed, so that the operating characteristics of the gas turbine can be improved. Further, if the start-up state of the gas turbine comes out of the region where the rotating stall occurs, the exhaust valve is closed and the operation of the driving fluid supply device is stopped. Then, the exhaust of the compressed air bled from the compressor to the turbine exhaust system is stopped, and a sufficient amount of compressed air is secured in the compressor, so that a rated operation can be performed at an early stage.

In the gas turbine according to the above aspect of the present invention, the control device closes the exhaust valve and stops an operation of the driving fluid supply device, if a rotational speed of the gas turbine becomes equal to or higher than a predetermined rotational speed at which a rotating stall does not occur.

Therefore, a region where the start-up state of the gas turbine generates the rotating stall is defined by the rotational speed of the gas turbine, whereby it is possible to simplify the operation control of the gas turbine by the control device.

In the gas turbine according to the above aspect of the present invention, the gas turbine further includes a pressure detector which detects a pressure of the compressed air flowing through the exhaust passage or a pressure of the driving fluid which is supplied to the ejector by the driving fluid supply device, and the control device controls an operation of the driving fluid supply device, based on the detection result of the pressure detector.

Therefore, the supplied amount of the driving fluid is adjusted according to the pressure of the compressed air flowing through the exhaust passage or the pressure of the driving fluid which is supplied to the ejector, whereby it is possible to change the amount of compressed air which is exhausted to the turbine exhaust system and appropriately suppress the occurrence of the rotating stall.

In the gas turbine according to the above aspect of the present invention, the driving fluid supply device includes a driving fluid supply passage for supplying the driving fluid to the ejector and a flow regulation valve which is provided in the driving fluid supply passage, and the control device controls a degree of opening of the flow regulation valve, based on a detection result of the pressure detector.

Therefore, the degree of opening of the flow regulation valve is controlled according to the pressure of the compressed air flowing through the exhaust passage or the pressure of the driving fluid which is supplied to the ejector, whereby it is possible to adjust the supplied amount of the driving fluid which is supplied from the driving fluid supply passage to the ejector and change the amount of compressed air which is exhausted to the turbine exhaust system, and thus it is possible to appropriately suppress the occurrence of the rotating stall regardless of the operating state of the gas turbine.

In the gas turbine according to the above aspect of the present invention, the driving fluid supply device supplies a driving fluid having a pressure higher than the pressure of the compressed air flowing through the exhaust passage to the ejector.

Therefore, a high-pressure driving fluid is supplied to the ejector, whereby the ejector can stably increase the speed of the compressed air flowing through the exhaust passage.

In the gas turbine according to the above aspect of the present invention, the driving fluid supply device supplies the compressed air which is supplied from the compressor to the combustor to the ejector.

Therefore, the compressed air which is supplied from the compressor to the combustor is supplied to the ejector, whereby high-pressure compressed air can be supplied to the ejector, and thus it is possible to stably increase the speed of the compressed air flowing through the exhaust passage.

In the gas turbine according to the above aspect of the present invention, a first bleed passage and a second bleed passage which each supply the compressed air bled from a first bleed chamber and a second bleed chamber further on the high-pressure side than the first bleed chamber of the compressor to the turbine as cooling air are provided, a first exhaust passage and a second exhaust passage which each exhaust the compressed air in the first bleed passage and the second bleed passage to the turbine exhaust system are provided, the ejector is provided in the first exhaust passage, and the driving fluid supply device supplies the compressed air flowing through the second exhaust passage to the ejector.

Therefore, the high-pressure compressed air bled from the compressor is supplied to the ejector, whereby low-pressure compressed air bled from the compressor is increased in speed by the ejector and supplied to the turbine exhaust system, and thus wasteful compressed air which is exhausted can be effectively used.

In the gas turbine according to the above aspect of the present invention, the driving fluid supply device supplies compressed air from a compressed air supply source which is provided outside to the ejector.

Therefore, the compressed air from the external compressed air supply source is supplied to the ejector, whereby high-pressure compressed air can be supplied to the ejector regardless of the operating state of the gas turbine, and thus it is possible to stably increase the speed of the compressed air flowing through the exhaust passage.

In the gas turbine according to the above aspect of the present invention, the driving fluid supply device includes a first driving fluid supply device which supplies compressed air from an external compressed air supply source which is provided outside the compressor and a casing of the combustor to the ejector, and a second driving fluid supply device which supplies compressed air from an internal compressed air supply source which is provided inside the compressor or the casing of the combustor to the ejector, and the control device operates the first driving fluid supply device and stops the second driving fluid supply device, at the time of start-up, and stops the first driving fluid supply device and operates the second driving fluid supply device, if a rotational speed of the gas turbine reaches a predetermined rotational speed set in advance.

Therefore, at the time of the start-up of the gas turbine, the compressed air from the external compressed air supply source is supplied to the ejector by the first driving fluid supply device, and if the rotational speed of the gas turbine reaches the predetermined rotational speed, the compressed air from the internal compressed air supply source is supplied to the ejector by the second driving fluid supply device, whereby it is possible to suppress the occurrence of the rotating stall by operating the ejector at all times, regardless of the operating state of the gas turbine.

In the gas turbine according to the above aspect of the present invention, the exhaust valve is integrally provided in the ejector.

Therefore, the exhaust valve is integrally provided in the ejector, whereby it is possible to simplify a structure by simplifying the compressed air exhaust system.

In the gas turbine according to the above aspect of the present invention, the gas turbine further includes: a cooling air passage for supplying the cooling air to an upper portion of a casing of the combustor; an on-off valve which is provided in the cooling air passage; an ejector for cooling air which is provided in the cooling air passage; and a driving fluid supply device for cooling air which supplies a driving fluid to the ejector for cooling air, and the control device opens the on-off valve and operates the driving fluid supply device for cooling air, after the stopping of the gas turbine.

Therefore, after the stopping of the gas turbine, the on-off valve is opened and the driving fluid supply device for cooling air is operated to operate the ejector for cooling air, whereby the cooling air flowing through the cooling air passage is increased in speed by the ejector for cooling air and supplied to the upper portion of the casing of the combustor. For this reason, after the stopping of the gas turbine, the upper space in the casing of the combustor can be stirred and cooled by the cooling air, and thus a temperature difference between the upper and lower portions of the casing can be reduced, so that deformation can be suppressed.

Further, according to another aspect of the present invention, there is provided a method for operating a gas turbine which includes a compressor, a combustor, and a turbine, the method including: a step of starting the gas turbine; a step of supplying compressed air bled from the compressor to the turbine as cooling air; a step of operating the gas turbine at a rated rotational speed; a step of stopping the gas turbine; and a step of increasing a speed of some of the compressed air bled from the compressor by an ejector and exhausting the compressed air to a turbine exhaust system, at the time of start-up or stopping of the gas turbine.

Therefore, at the time of the start-up or the stopping of the gas turbine, some of the compressed air bled from the compressor is increased in speed by the ejector and exhausted to the turbine exhaust system, and therefore, the load on the compressor blades is reduced, and thus the occurrence of the rotating stall is suppressed, so that the operating characteristics of the gas turbine can be improved. Further, the bled compressed air can be exhausted to the turbine exhaust system at an early stage and in an increased amount due to the ejector, so that it is possible to downsize the apparatus or reduce the construction cost.

In the method for operating a gas turbine according to the above aspect of the present invention, the method further includes a step of stopping exhaust of the compressed air bled from the compressor to the turbine exhaust system, if a rotational speed of the gas turbine becomes equal to or higher than a predetermined rotational speed at which a rotating stall does not occur.

Therefore, if the start-up state of the gas turbine comes out of the region where the rotating stall occurs, the exhaust of the compressed air bled from the compressor to the turbine exhaust system is stopped, and therefore, a sufficient amount of compressed air is secured in the compressor, so that a rated operation can be performed at an early stage.

Advantageous Effects of Invention

According to the gas turbine and the method for operating a gas turbine according to the above aspects of the present invention, the control device which opens the exhaust valve and operates the driving fluid supply device, when the operating state of the gas turbine is in the region where the rotating stall occurs, is provided, and therefore, some of the compressed air bled from the compressor is increased in speed by the ejector and exhausted to the turbine exhaust system, and the load of the compressor blades is reduced, and thus the occurrence of the rotating stall is suppressed, so that thus the operating characteristics of the gas turbine can be improved. Further, the bled compressed air can be exhausted to the turbine exhaust system at an early stage and in an increased amount due to the ejector, so that it is possible to downsize the apparatus or reduce the construction cost.

DESCRIPTION OF EMBODIMENTS

Hereinafter, preferred embodiments of a gas turbine and a method for operating a gas turbine according to the present invention will be described in detail with reference to the accompanying drawings. The present invention is not limited by these embodiments, and in a case where there are a plurality of embodiments, the present invention also includes configurations made by combining the respective embodiments.

First Embodiment

Figure 1:
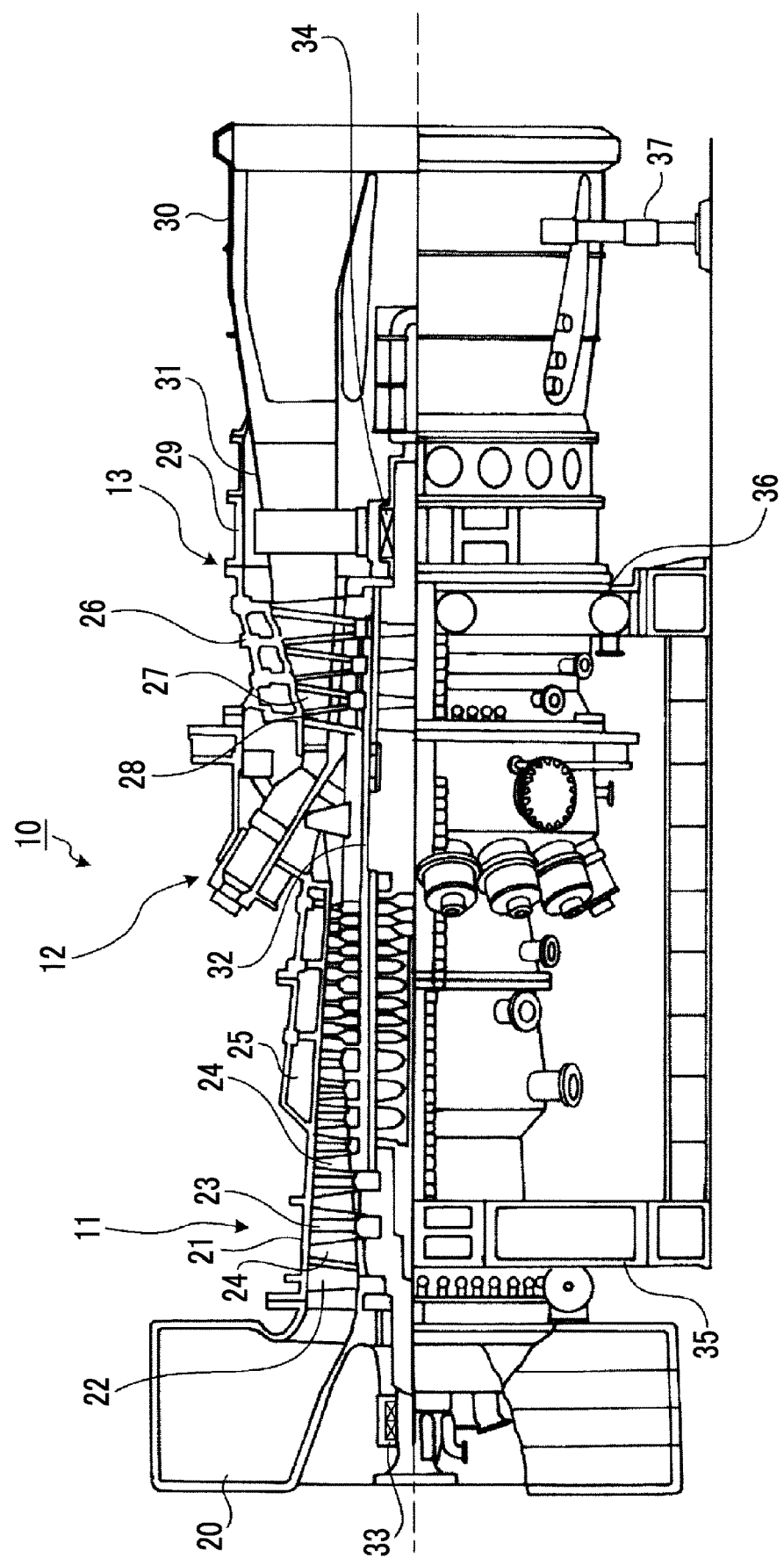
FIG. 1 is a schematic configuration diagram showing a gas turbine of a first embodiment.

FIG. 1 is a schematic configuration diagram showing a gas turbine of a first embodiment.

In the first embodiment, as shown in FIG. 1, a gas turbine 10 includes a compressor 11, a combustor 12, and a turbine 13. A power generator (not shown) is coaxially connected to the gas turbine 10, and thus the gas turbine 10 is made to be able to generate electric power.

The compressor 11 has an air intake port 20 for taking in air, and in a compressor casing 21, an inlet guide vane (IGV) 22 is disposed and also a plurality of compressor vanes 23 and a plurality of compressor blades 24 are alternately disposed in a front-rear direction (an axial direction of a rotor 32 (described later)), and a bleed chamber 25 is provided outside the compressor casing 21. The combustor 12 is made to supply fuel to compressed air compressed in the compressor 11 and be able to burn the fuel-air mixture by igniting it. In the turbine 13, a plurality of turbine vanes 27 and a plurality of turbine blades 28 are alternately disposed in a turbine casing 26 in the front-rear direction (the axial direction of the rotor 32 (described later)). An exhaust chamber 30 is disposed on the downstream side of the turbine casing 26 through an exhaust casing 29, and the exhaust chamber 30 has an exhaust diffuser 31 which is continuous with the turbine 13.

Further, the rotor (rotary shaft) 32 is located so as to penetrate the center portions of the compressor 11, the combustor 12, the turbine 13, and the exhaust chamber 30. An end portion of the rotor 32 on the compressor 11 side is rotatably supported by a bearing part 33, and an end portion of the rotor 32 on the exhaust chamber 30 side is rotatably supported by a bearing part 34. Further, in the compressor 11, a plurality of overlapping disks on which the compressor blades 24 are respectively mounted are fixed to the rotor 32, and in the turbine 13, a plurality of overlapping disks on which the turbine blades 28 are respectively mounted are fixed to the rotor 32, and a drive shaft of the power generator (not shown) is connected to an end portion of the rotor 32 on the exhaust chamber 30 side.

Further, in the gas turbine 10, the compressor casing 21 of the compressor 11 is supported by a leg part 35, the turbine casing 26 of the turbine 13 is supported by a leg part 36, and the exhaust chamber 30 is supported by a leg part 37.

Therefore, air taken in through the air intake port 20 of the compressor 11 passes through the inlet guide vane 22, the plurality of compressor vanes 23, and the plurality of compressor blades 24 and is compressed, thereby becoming high-temperature and high-pressure compressed air. In the combustor 12, predetermined fuel is supplied to the compressed air and burns. Then, a high-temperature and high-pressure combustion gas, which is a working fluid generated in the combustor 12, passes through the plurality of turbine vanes 27 and the turbine blades 28 configuring the turbine 13, thereby drivingly rotating the rotor 32 to drive the power generator connected to the rotor 32. On the other hand, the combustion gas which has driven the turbine 13 is released to the atmosphere as an exhaust gas.

In the gas turbine 10 configured in this manner, the turbine 13 is cooled by supplying some compressed air bled from the compressor 11 to the turbine 13 as cooling air. Further, at the time of start-up of the gas turbine 10, compressed air is secured by driving the compressor 11 by drivingly rotating the rotor 32 by a starting motor (for example, a motor generator which is used as a power generator). However, when the compressed air is generated in the compressor 11, a load on the compressor blades 24 increases, and thus there is a concern that a rotating stall may occur. In particular, if a pressure ratio increases according to higher-performance of the gas turbine 10, the rotating stall easily occurs. For this reason, at the time of the start-up of the gas turbine 10, some compressed air bled from the compressor 11 is exhausted to a turbine exhaust system, thereby reducing the load on the compressor blades 24 to suppress the occurrence of the rotating stall.

Figure 2:
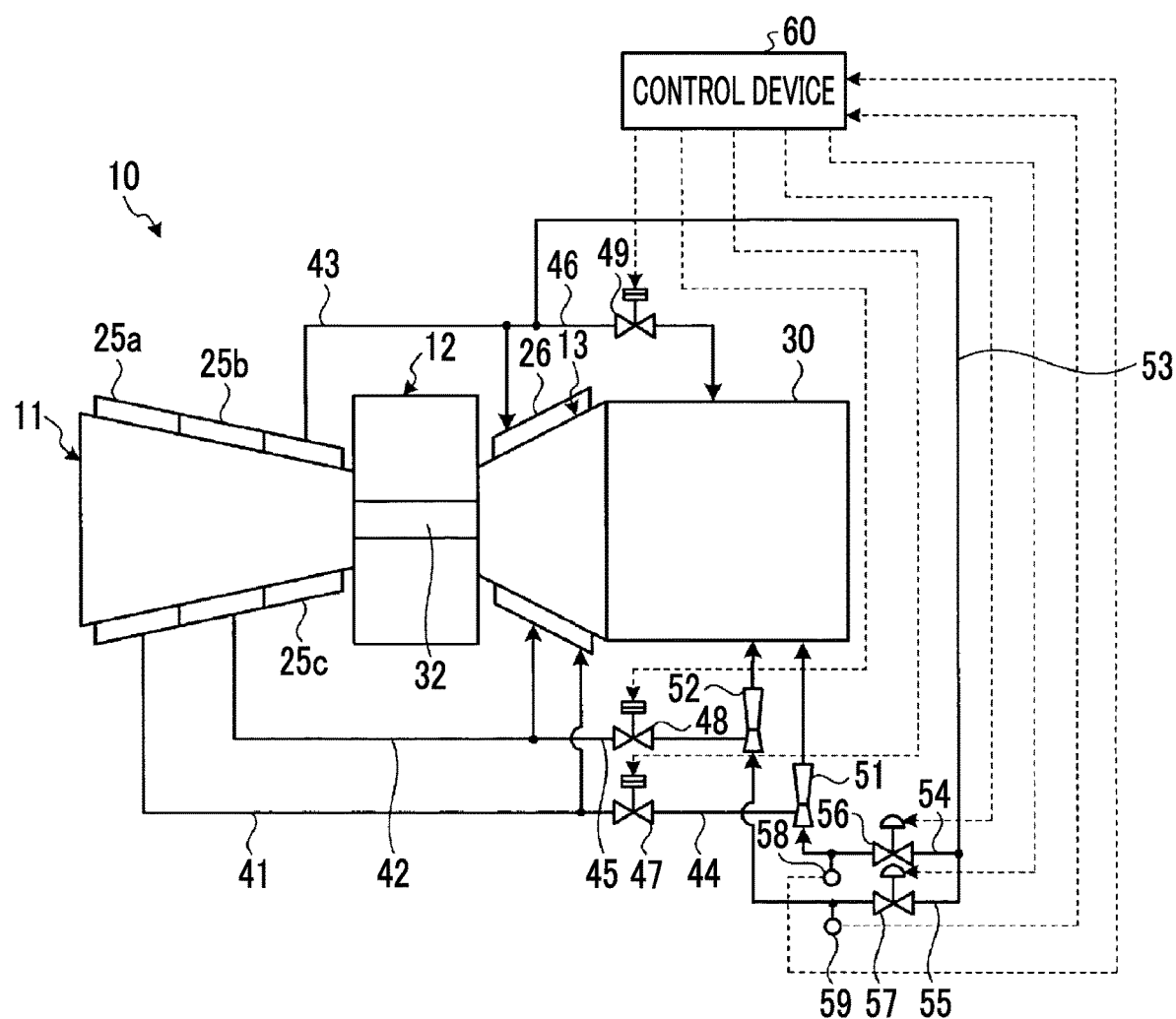
FIG. 2 is a schematic diagram showing a bleed system of the gas turbine of the first embodiment.

FIG. 2 is a schematic diagram showing a bleed system of the gas turbine of the first embodiment.

In the gas turbine 10, as shown in FIG. 2, the compressor casing 21 is provided with a low-pressure bleed chamber (a first bleed chamber) 25a, a medium-pressure bleed chamber (a first bleed chamber) 25b, and a high-pressure bleed chamber (a second bleed chamber) 25c. One end portion of a low-pressure bleed passage (a first bleed passage) 41 is connected to the low-pressure bleed chamber 25a, and the other end portion thereof is connected to a downstream portion of the turbine casing 26. One end portion of a medium-pressure bleed passage (a first bleed passage) 42 is connected to the medium-pressure bleed chamber 25b, and the other end portion thereof is connected to a midstream portion of the turbine casing 26. One end portion of a high-pressure bleed passage (a second bleed passage) 43 is connected to the high-pressure bleed chamber 25c, and the other end portion thereof is connected to an upstream portion of the turbine casing 26.

Here, the compressor 11 is provided with a plurality of stages and has a configuration in which the plurality of compressor vanes 23 and the plurality of compressor blades 24 are alternately disposed in the axial direction of the rotor 32, and for example, if the compressor 11 has fifteen stages, the low-pressure bleed chamber 25a is provided corresponding to the first to sixth stages, the medium-pressure bleed chamber 25b is provided corresponding to the seventh to ninth stages, and the high-pressure bleed chamber 25c is provided corresponding to the tenth to twelfth steps.

One end portion of a low-pressure exhaust passage (a first exhaust passage) 44 is connected to a middle portion of the low-pressure bleed passage 41, and the other end portion thereof is connected to the exhaust chamber 30 (or an exhaust duct) as the turbine exhaust system. One end portion of a medium-pressure exhaust passage (a first exhaust passage) 45 is connected to a middle portion of the medium-pressure bleed passage 42, and the other end portion thereof is connected to the exhaust chamber 30 (or the exhaust duct). One end portion of a high-pressure exhaust passage (a second exhaust passage) 46 is connected to a middle portion of the high-pressure bleed passage 43, and the other end portion thereof is connected to the exhaust chamber 30 (or the exhaust duct). Further, a low-pressure exhaust valve (a first exhaust valve) 47 is provided in the low-pressure exhaust passage 44, a medium-pressure exhaust valve (a first exhaust valve) 48 is provided in the medium-pressure exhaust passage 45, and a high-pressure exhaust valve (a second exhaust valve) 49 is provided in the high-pressure exhaust passage 46.

For this reason, if the low-pressure exhaust valve 47 is closed, the low-pressure compressed air bled into the low-pressure bleed chamber 25a is supplied to the downstream side of the turbine casing 26 through the low-pressure bleed passage 41. On the other hand, if the low-pressure exhaust valve 47 is opened, the low-pressure compressed air bled into the low-pressure bleed chamber 25a is exhausted from the low-pressure bleed passage 41 to the exhaust chamber 30 through the low-pressure exhaust passage 44. Further, if the medium-pressure exhaust valve 48 is closed, the medium-pressure compressed air bled into the medium-pressure bleed chamber 25b is supplied to the midstream side of the turbine casing 26 through the medium-pressure bleed passage 42. On the other hand, if the medium-pressure exhaust valve 48 is opened, the medium-pressure compressed air bled into the medium-pressure bleed chamber 25b is exhausted from the medium-pressure bleed passage 42 to the exhaust chamber 30 through the medium-pressure exhaust passage 45. Further, if the high-pressure exhaust valve 49 is closed, the high-pressure compressed air bled into the high-pressure bleed chamber 25c is supplied to the upstream side of the turbine casing 26 through the high-pressure bleed passage 43. On the other hand, if the high-pressure exhaust valve 49 is opened, the high-pressure compressed air bled into the high-pressure bleed chamber 25c is exhausted from the high-pressure bleed passage 43 to the exhaust chamber 30 through the high-pressure exhaust passage 46.

The low-pressure exhaust valve 47, the medium-pressure exhaust valve 48, and the high-pressure exhaust valve 49 are flow regulation valves, and the degrees of opening of the low-pressure exhaust valve 47, the medium-pressure exhaust valve 48, and the high-pressure exhaust valve 49 can be adjusted. In a case where it is not necessary to adjust the degrees of opening of the low-pressure exhaust valve 47, the medium-pressure exhaust valve 48, and the high-pressure exhaust valve 49, the low-pressure exhaust valve 47, the medium-pressure exhaust valve 48, and the high-pressure exhaust valve 49 may be on-off valves (shut-off valves).

For this reason, cooling air (compressed air) bled from the respective bleed chambers 25a, 25b, and 25c of the compressor 11 is supplied from the bleed passages 41, 42, and 43 to the turbine casing 26, thereby being able to cool the turbine vanes 27 or a constituent part or the like supporting the turbine vanes 27. Further, the cooling air (compressed air) bled from the respective bleed chambers 25a, 25b, and 25c of the compressor 11 is exhausted from the exhaust passages 44, 45, and 46 to the exhaust chamber 30, whereby the load on the compressor blades 24 is reduced, and thus it is possible to suppress the occurrence of the rotating stall.

Incidentally, in the gas turbine 10 described above, it is necessary to exhaust the compressed air bled from the respective bleed chambers 25a, 25b, and 25c of the compressor 11 to the exhaust chamber 30 in order to suppress the occurrence of the rotating stall, and it is necessary to dispose a large number of pipes as the bleed passages 41, 42, and 43 and the exhaust passages 44, 45, and 46. However, according to an increase in the size of the gas turbine 10, large diameter pipes are required for the large number of pipes, and thus the piping cost increases and the construction cost also increases.

For this reason, in the gas turbine of the first embodiment, an ejector is provided in each of the exhaust passages 44, 45, and 46 so as to increase a feed speed of the compressed air. That is, a low-pressure ejector 51 is disposed further on the downstream side in a flow direction of the compressed air than the low-pressure exhaust valve 47 in the low-pressure exhaust passage 44. A medium-pressure ejector 52 is disposed further on the downstream side in the flow direction of the compressed air than the medium-pressure exhaust valve 48 in the medium-pressure exhaust passage 45. Further, one end portion of a driving air supply passage (a driving fluid supply passage) 53 is connected to further the upstream side in the flow direction of the compressed air than the high-pressure exhaust valve 49 in the high-pressure exhaust passage 46, and the other end portion thereof is branched into a low-pressure driving air supply passage 54 and a medium-pressure driving air supply passage 55. Then, the low-pressure driving air supply passage 54 is provided with a low-pressure flow regulation valve 56 and connected to the low-pressure ejector 51, and the medium-pressure driving air supply passage 55 is provided with a medium-pressure flow regulation valve 57 and connected to the medium-pressure ejector 52. Further, the low-pressure driving air supply passage 54 has a pressure detector 58 provided further on the downstream side in the flow direction of the compressed air (the driving fluid) than the low-pressure flow regulation valve 56, and the medium-pressure driving air supply passage 55 has a pressure detector 59 provided further on the downstream side in the flow direction of the compressed air (the driving fluid) than the medium-pressure flow regulation valve 57.

The low-pressure ejector 51 and the medium-pressure ejector 52 are two-phase flow ejectors, in which the driving air supply passages 54 and 55 are respectively connected to the respective supply ports, the downstream-side end portions of the exhaust passages 44 and 45 are respectively connected to the respective suction ports, and the respective exhaust ports are connected to the exhaust chamber 30. For this reason, if each of the flow regulation valves 56 and 57 is opened, the high-pressure compressed air bled into the high-pressure bleed chamber 25c flows from the high-pressure exhaust passage 46 to the driving air supply passage 53 as a driving fluid and is supplied to the supply port of each of the ejectors 51 and 52 through each of the driving air supply passages 54 and 55. Then, the compressed air in each of the exhaust passages 44 and 45 is suctioned into each of the ejectors 51 and 52 through the suction port, and the compressed air becomes a two-phase flow and is exhausted to the exhaust chamber 30 at an increased speed.

Here, a driving fluid supply device in the present invention includes the driving air supply passage 53, the low-pressure driving air supply passage 54, the medium-pressure driving air supply passage 55, the low-pressure flow regulation valve 56, and the medium-pressure flow regulation valve 57.

In the gas turbine 10 of the first embodiment, after the start-up is started and before the start-up state of the gas turbine 10 reaches a region where the rotating stall occurs, or at the time of starting of the start-up, the respective exhaust valves 47, 48, and 49 are opened, and the respective flow regulation valves 56 and 57 are opened in order to operate the respective ejectors 51 and 52. Further, in the gas turbine 10 of the first embodiment, if the start-up state of the gas turbine 10 comes out of the region where the rotating stall occurs, that is, if the rotational speed of the gas turbine 10 reaches a predetermined rotational speed (for example, a rated rotational speed) set in advance, the respective exhaust valves 47, 48, and 49 are closed and the flow regulation valves 56 and 57 are closed in order to stop the operation of the respective ejectors 51 and 52.

A control device 60 can control the opening and closing of the low-pressure exhaust valve 47, the medium-pressure exhaust valve 48, the high-pressure exhaust valve 49, the low-pressure flow regulation valve 56, and the medium-pressure flow regulation valve 57 and can also adjust the degrees of opening of the valves. For this reason, at the time of the start-up of the gas turbine 10, the control device 60 opens the low-pressure exhaust valve 47, the medium-pressure exhaust valve 48, and the high-pressure exhaust valve 49 and also opens the low-pressure flow regulation valve 56 and the medium-pressure flow regulation valve 57, and drivingly rotates the rotor 32 by a starting motor to start the gas turbine 10. Then, if the rotational speed of the gas turbine 10 reaches a predetermined rotational speed, the control device 60 closes the respective exhaust valves 47, 48, and 49 and also closes the respective flow regulation valves 56 and 57.

Specifically, if the rotational speed of the gas turbine 10 (the compressor 11) reaches a predetermined first rotational speed set in advance, the high-pressure exhaust valve 49 is closed. If the rotational speed of the gas turbine 10 reaches a predetermined second rotational speed set in advance, which is higher than the first rotational speed, the low-pressure exhaust valve 47 is closed, and if the rotational speed of the gas turbine 10 reaches a predetermined third rotational speed set in advance, which is higher than the second rotational speed, the medium-pressure exhaust valve 48 is closed. In this case, the high-pressure exhaust valve 49, the low-pressure exhaust valve 47, and the medium-pressure exhaust valve 48 do not need to be fully closed at a time and may be gradually or stepwise closed. Further, the closing order of the low-pressure exhaust valve 47 and the medium-pressure exhaust valve 48 may be reversed. Further, since the first rotational speed, the second rotational speed, and the third rotational speed vary according to the model of the gas turbine 10, they are set in advance through experiments or the like.

If the control device 60 opens the low-pressure exhaust valve 47, the medium-pressure exhaust valve 48, and the high-pressure exhaust valve 49, the compressed air bled into the respective bleed chambers 25a, 25b, and 25c flows from the respective bleed passages 41, 42, and 43 to the respective exhaust passages 44, 45, and 46, as described above, and if the control device 60 opens the low-pressure flow regulation valve 56 and the medium-pressure flow regulation valve 57, the high-pressure compressed air in the high-pressure exhaust passage 46 is supplied from the driving air supply passage 53 to the respective ejectors 51 and 52 through the respective driving air supply passages 54 and 55 to operate the respective ejectors 51 and 52. That is, in the low-pressure ejector 51, the high-pressure compressed air flowing inside draws the low-pressure compressed air flowing through the low-pressure exhaust passage 44, and the high-pressure compressed air and the low-pressure compressed air are mixed in the interior to form a two-phase flow, which is pushed out toward the exhaust chamber 30 to be exhausted to the exhaust chamber 30 at an increased speed. Further, in the medium-pressure ejector 52, the high-pressure compressed air flowing inside draws the medium-pressure compressed air flowing through the medium-pressure exhaust passage 45, and the high-pressure compressed air and the medium-pressure compressed air are mixed in the interior to form a two-phase flow, which is pushed out toward the exhaust chamber 30 to be exhausted to the exhaust chamber 30 at an increased speed.

At this time, the pressure detector 58 detects the pressure of the high-pressure compressed air which flows through the low-pressure driving air supply passage 54 and is supplied to the low-pressure ejector 51, and the pressure detector 59 detects the pressure of the high-pressure compressed air which flows through the medium-pressure driving air supply passage 55 and is supplied to the medium-pressure ejector 52. The control device 60 adjusts the degree of opening of the low-pressure flow regulation valve 56, based on the pressure of the high-pressure compressed air which is supplied to the low-pressure ejector 51, and adjusts the degree of opening of the medium-pressure flow regulation valve 57, based on the pressure of the high-pressure compressed air which is supplied to the medium-pressure ejector 52. That is, the exhaust amount of the compressed air which is exhausted from the respective bleed chambers 25a, 25b, and 25c to the exhaust chamber 30 in order to suppress the occurrence of the rotating stall at the time of the start-up is set in accordance with the performance of the gas turbine 10. For this reason, the degree of opening of each of the flow regulation valves 56 and 57 is adjusted such that the exhaust amount of the compressed air which is exhausted from each of the bleed chambers 25a, 25b, and 25c to the exhaust chamber 30 becomes a predetermined amount.

A configuration may be made such that a pressure detector which detects the pressure of the compressed air flowing through the low-pressure exhaust passage 44 and a pressure detector which detects the pressure of the compressed air flowing through the medium-pressure exhaust passage 45 are provided and the control device 60 adjusts the degree of opening of each of the flow regulation valve 56 and 57, based on the detection result of each of the pressure detectors.

In this manner, the gas turbine of the first embodiment includes: the low-pressure bleed passage 41, the medium-pressure bleed passage 42, and the high-pressure bleed passage 43 which supply the compressed air bled from the low-pressure bleed chamber 25a, the medium-pressure bleed chamber 25b, and the high-pressure bleed chamber 25c of the compressor 11 to the turbine 13 as cooling air; the low-pressure exhaust passage 44, the medium-pressure exhaust passage 45, and the high-pressure exhaust passage 46 which exhaust the compressed air in the low-pressure bleed passage 41, the medium-pressure bleed passage 42, and the high-pressure bleed passage 43 to the turbine exhaust system; the low-pressure exhaust valve 47, the medium-pressure exhaust valve 48, the high-pressure exhaust valve 49 which are respectively provided in the low-pressure exhaust passage 44, the medium-pressure exhaust passage 45, and the high-pressure exhaust passage 46; the low-pressure ejector 51 and the medium-pressure ejector 52 which are respectively provided in the low-pressure exhaust passage 44 and the medium-pressure exhaust passage 45; the driving air supply passage 53 for supplying the compressed air as a driving fluid to the low-pressure ejector 51 and the medium-pressure ejector 52; and the control device 60 which opens the respective exhaust valves 47, 48, and 49 and supplies the compressed air from the driving air supply passage 53 to the respective ejectors 51 and 52, when the operating state of the gas turbine 10 is in the region where the rotating stall occurs.

Therefore, when the gas turbine 10 is started, the compressor 11 is driven by the starting motor to compress air and the compressed air flows to the combustor 12 side. However, at this time, the load on the compressor blades 24 in the compressor 11 increases, and thus there is a concern that the rotating stall may occur. For this reason, when the operating state of the gas turbine 10 is in a region reaching the region where the rotating stall occurs, the respective exhaust valves 47, 48, and 49 are opened and the flow regulation valves 56 and 57 are also opened, whereby the compressed air as a driving fluid is supplied to the respective ejectors 51 and 52 to operate the respective ejectors 51 and 52. Then, some of the compressed air bled from the compressor 11 is increased in speed by the respective ejectors 51 and 52 and exhausted to the exhaust chamber 30. For this reason, the load on the compressor blades 24 is reduced, and thus the occurrence of the rotating stall is suppressed, so that the operating characteristics of the gas turbine 10 can be improved.

At this time, the compressed air flowing through each of the exhaust passages 44 and 45 is increased in speed by each of the ejectors 51 and 52 and exhausted to the exhaust chamber 30. For this reason, if the supplied amount per unit time of the compressed air which is exhausted from each of the exhaust passages 44 and 45 to the exhaust chamber 30 is made equal to that in the related art, it is possible to reduce the diameter of the pipe configuring each of the exhaust passages 44 and 45, and thus it is possible to downsize the apparatus or reduce the construction cost, compared to the related art. On the other hand, in a case where the diameter of the pipe configuring each of the exhaust passages 44 and 45 is made equal to that in the related art, since the flow rate per unit time of the compressed air which is exhausted from each of the exhaust passages 44 and 45 to the exhaust chamber 30 increases, the compressed air can be exhausted to the exhaust chamber 30 at an early stage and in an increased amount, so that improvement in performance can be achieved.

In the gas turbine of the first embodiment, at the time of the start-up of the gas turbine 10, the control device 60 opens the exhaust valves 47, 48, and 49 and also opens the respective flow regulation valves 56 and 57 to operate the respective ejectors 51 and 52, and if the start-up state of the gas turbine 10 comes out of the region where the rotating stall occurs, the control device 60 closes the respective exhaust valves 47, 48, and 49 and also closes the respective flow regulation valves 56 and 57 to stop the operation of the respective ejectors 51 and 52. Therefore, when the gas turbine 10 is started, some of the compressed air bled from the compressor 11 is increased in speed by the respective ejectors 51 and 52 and exhausted to the exhaust chamber 30, and therefore, the load on the compressor blades 24 is reduced, and thus the occurrence of the rotating stall is suppressed, so that the operating characteristics of the gas turbine 10 can be improved. Then, if the start-up state of the gas turbine 10 comes out of the region where the rotating stall occurs, the exhaust of the compressed air bled from the compressor 11 to the exhaust chamber 30 is stopped, and therefore, it is possible to secure a sufficient amount of compressed air in the compressor 11 and perform the rated operation at an early stage.

In the gas turbine of the first embodiment, when the rotational speed of the gas turbine 10 becomes equal to or higher than a predetermined rotational speed at which the rotating stall does not occur, the control device 60 closes the respective exhaust valves 47, 48, and 49 and also closes the respective flow regulation valves 56 and 57, thereby stopping the operation of the respective ejectors 51 and 52. Therefore, the region where the start-up state of the gas turbine 10 generates the rotating stall is defined by the rotational speed of the gas turbine 10, whereby it is possible to simplify the operation control of the gas turbine 10 by the control device 60.

In the gas turbine of the first embodiment, the pressure detectors 58 and 59 which detect the pressure of the compressed air flowing through the exhaust passages 44, 45, and 46 or the pressure of the compressed air flowing through the driving air supply passages 54 and 55 are provided, and the control device 60 controls the operation of each of the ejectors 51 and 52, based on the detection results of each of the pressure detectors 58 and 59. Therefore, it is possible to change the amount of the compressed air which is exhausted to the exhaust chamber 30 and to appropriately suppress the occurrence of the rotating stall.

In the gas turbine of the first embodiment, the flow regulation valves 56 and 57 and the pressure detectors 58 and 59 are provided in the driving air supply passages 54 and 55, and the control device 60 controls the degree of opening of each of the flow regulation valves 56 and 57, based on the detection results of each of the pressure detectors 58 and 59. Therefore, only with the adjustment of the degree of opening of each of the flow regulation valves 56 and 57, it is possible to adjust the supplied amount of the compressed air which is supplied to each of the ejectors 51 and 52 and change the amount of the compressed air which is exhausted to the exhaust chamber 30, and thus it is possible to appropriately suppress the occurrence of the rotating stall regardless of the operating state of the gas turbine 10.

In the gas turbine of the first embodiment, the compressed air flowing through the exhaust passage 46, which has a pressure higher than the pressure of the compressed air flowing through the exhaust passages 44 and 45, is supplied to the respective ejectors 51 and 52. Therefore, the respective ejectors 51 and 52 can stably increase the speed of the compressed air flowing through the exhaust passages 44 and 45.

Further, a method for operating a gas turbine according to the first embodiment includes a step of starting the gas turbine 10, a step of supplying compressed air bled from the compressor 11 to the turbine 13 as cooling air, and a step of exhausting some of the compressed air bled from the compressor 11 to the exhaust chamber 30 with a speed increased by the ejectors 51 and 52.

Therefore, at the time of the driving of the gas turbine 10, some of the compressed air bled from the compressor 11 is exhausted to the exhaust chamber 30 with a speed increased by the ejectors 51 and 52, and therefore, the load on the compressor blades 24 is reduced, and thus the occurrence of the rotating stall is suppressed, so that the operating characteristics of the gas turbine 10 can be improved. Further, the bled compressed air can be exhausted to the exhaust chamber 30 at an early stage and in an increased amount due to the ejectors 51 and 52, so that it is possible to downsize the apparatus or reduce the construction cost.

The method for operating a gas turbine according to the first embodiment includes a step of stopping the exhaust of the compressed air bled from the compressor 11 to the exhaust chamber 30 when the rotational speed of the gas turbine 10 becomes equal to or higher than a predetermined rotational speed at which the rotating stall does not occur. Therefore, the exhaust of the compressed air bled from the compressor 11 to the exhaust chamber 30 is stopped, and therefore, it is possible to secure a sufficient amount of compressed air in the compressor 11 and perform the rated operation at an early stage.

Second Embodiment

Figure 3:
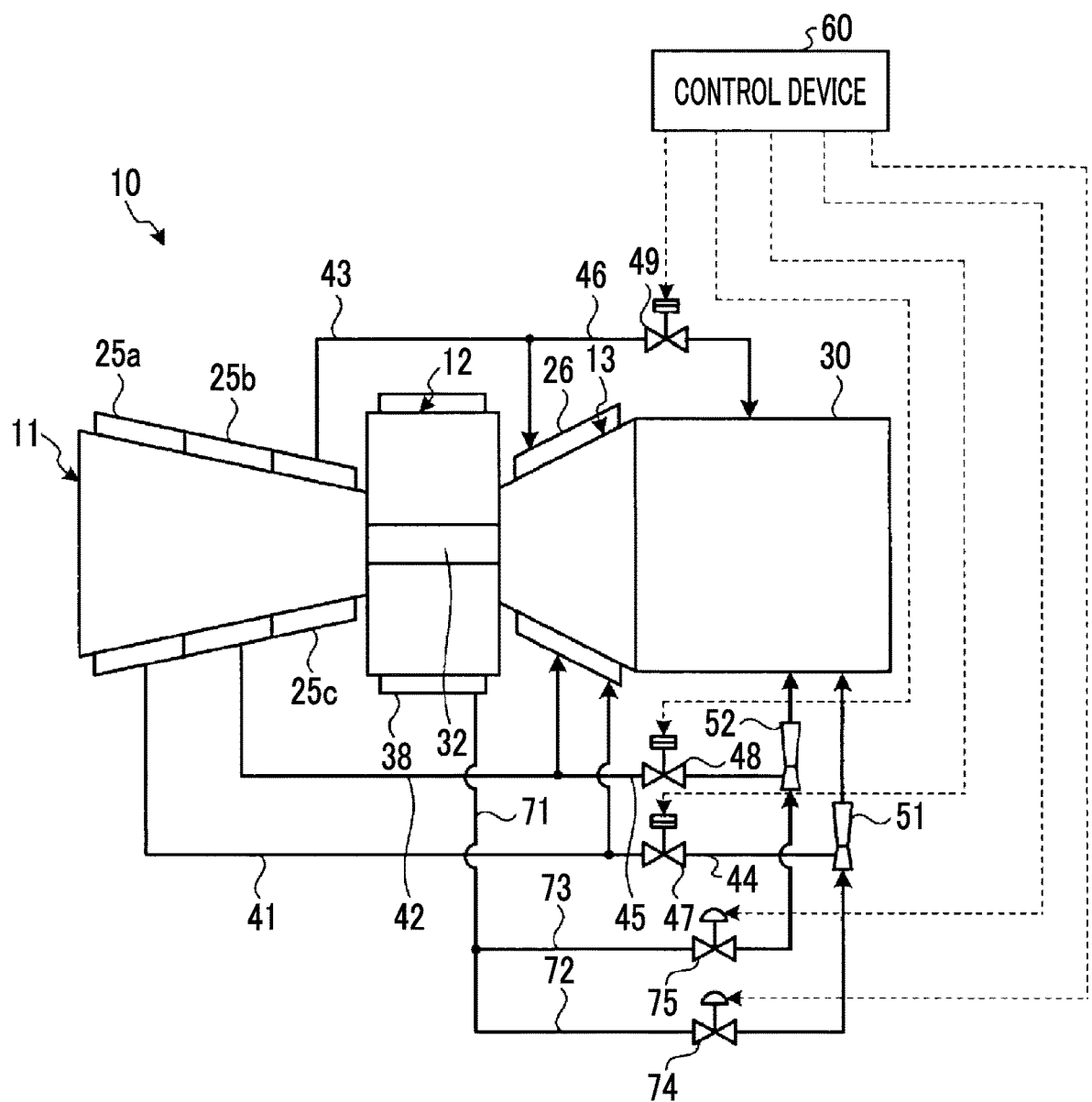
FIG. 3 is a schematic diagram showing a bleed system of a gas turbine of a second embodiment.

FIG. 3 is a schematic diagram showing a bleed system of a gas turbine of a second embodiment. Members having the same functions as those in the embodiment described above are denoted by the same reference numerals, and a detailed description thereof is omitted.

In the second embodiment, as shown in FIG. 3, the gas turbine 10 includes the compressor 11, the combustor 12, and the turbine 13. The configurations and operations of the low-pressure bleed passage 41, the medium-pressure bleed passage 42, the high-pressure bleed passage 43, the low-pressure exhaust passage 44, the medium-pressure exhaust passage 45, the high-pressure exhaust passage 46, the low-pressure exhaust valve 47, the medium-pressure exhaust valve 48, and the high-pressure exhaust valve 49 are the same as those in the first embodiment.

The low-pressure ejector 51 is disposed further on the downstream side in the flow direction of the compressed air than the low-pressure exhaust valve 47 in the low-pressure exhaust passage 44. The medium-pressure ejector 52 is disposed further on the downstream side in the flow direction of the compressed air than the medium-pressure exhaust valve 48 in the medium-pressure exhaust passage 45. Further, one end portion of a driving air supply passage 71 is connected to a casing (hereinafter referred to as a combustor casing) 38 of the combustor 12, and the other end portion thereof is branched into a low-pressure driving air supply passage 72 and a medium-pressure driving air supply passage 73. Then, the low-pressure driving air supply passage 72 is provided with a low-pressure flow regulation valve 74 and connected to the low-pressure ejector 51, and the medium-pressure driving air supply passage 73 is provided with a medium-pressure flow regulation valve 75 and connected to the medium-pressure ejector 52.

The low-pressure ejector 51 and the medium-pressure ejector 52 are two-phase flow ejectors, in which the driving air supply passages 72 and 73 are respectively connected to the respective supply ports, the downstream-side end portions of the exhaust passages 44 and 45 are respectively connected to the respective suction ports, and the respective exhaust ports are connected to the exhaust chamber 30. For this reason, if the respective flow regulation valves 74 and 75 are opened, the high-pressure compressed air bled from the combustor casing 38 flows to the driving air supply passage 71 as a driving fluid and is supplied to the supply ports of the respective ejectors 51 and 52 through the respective driving air supply passages 72 and 73. Then, the compressed air in the respective exhaust passages 44 and 45 is suctioned from the suction ports into the ejectors 51 and 52, and the compressed air becomes a two-phase flow and is exhausted to the exhaust chamber 30 at an increased speed.

In the second embodiment, after the gas turbine 10 starts start-up and before the start-up state of the gas turbine 10 reaches the region where the rotating stall occurs, or at the time of starting of the start-up, the respective exhaust valves 47, 48, and 49 are opened and the respective flow regulation valves 74 and 75 are also opened in order to operate the respective ejectors 51 and 52. Further, if the start-up state of the gas turbine 10 comes out of the region where the rotating stall occurs, that is, if the rotational speed of the gas turbine 10 reaches a predetermined rotational speed (for example, a rated rotational speed) set in advance, the respective exhaust valves 47, 48, and 49 are closed and the respective flow regulation valves 74 and 75 are also closed in order to stop the operation of the respective ejectors 51 and 52.

That is, if the control device 60 opens the low-pressure exhaust valve 47, the medium-pressure exhaust valve 48, and the high-pressure exhaust valve 49 at the time of the start-up of the gas turbine 10, the compressed air bled into the respective bleed chambers 25a, 25b, and 25c flows from the respective bleed passages 41, 42, and 43 into the respective exhaust passages 44, 45, and 46. Further, if the control device 60 opens the low-pressure flow regulation valve 74 and the medium-pressure flow regulation valve 75, the high-pressure compressed air in the combustor casing 38 is supplied from the driving air supply passage 71 to the respective ejectors 51 and 52 through the respective driving air supply passages 72 and 73 to operate the respective ejectors 51 and 52. That is, in the low-pressure ejector 51, the high-pressure compressed air flowing inside draws the low-pressure compressed air flowing through the low-pressure exhaust passage 44, and the high-pressure compressed air and the low-pressure compressed air are mixed in the interior to form a two-phase flow, which is pushed out toward the exhaust chamber 30 to be exhausted to the exhaust chamber 30 at an increased speed. Further, in the medium-pressure ejector 52, the high-pressure compressed air flowing inside draws the medium-pressure compressed air flowing through the medium-pressure exhaust passage 45, and the high-pressure compressed air and the medium-pressure compressed air are mixed in the interior to form a two-phase flow, which is pushed out toward the exhaust chamber 30 to be exhausted to the exhaust chamber 30 at an increased speed.

In this manner, in the gas turbine of the second embodiment, the gas turbine includes: the low-pressure ejector 51 and the medium-pressure ejector 52 which are respectively provided in the low-pressure exhaust passage 44 and the medium-pressure exhaust passage 45; the driving air supply passage 71 for supplying the compressed air in the combustor casing 38 as a driving fluid to the low-pressure ejector 51 and the medium-pressure ejector 52; and the control device 60 which opens the respective exhaust valves 47, 48, and 49 and supplies the compressed air from the driving air supply passage 71 to the respective ejectors 51 and 52, when the operating state of the gas turbine 10 is in the region where the rotating stall occurs.

Therefore, when the start-up state of the gas turbine 10 is in a region reaching the region where the rotating stall occurs, the respective exhaust valves 47, 48, and 49 are opened and the compressed air in the combustor casing 38 is supplied from the driving air supply passage 71 to the respective ejectors 51 and 52 to operate the respective ejectors 51 and 52. Then, some of the compressed air bled from the compressor 11 is increased in speed by the respective ejectors 51 and 52 and exhausted to the exhaust chamber 30. For this reason, the load on the compressor blades 24 is reduced, and thus the occurrence of the rotating stall is suppressed, so that the operating characteristics of the gas turbine 10 can be improved.

At this time, the compressed air flowing through each of the exhaust passages 44 and 45 is increased in speed by each of the ejectors 51 and 52 and exhausted to the exhaust chamber 30. For this reason, if the supplied amount per unit time of the compressed air which is exhausted from each of the exhaust passages 44 and 45 to the exhaust chamber 30 is made equal to that in the related art, it is possible to reduce the diameter of the pipe configuring each of the exhaust passages 44 and 45, and thus it is possible to downsize the apparatus or reduce the construction cost, compared to the related art. On the other hand, in a case where the diameter of the pipe configuring each of the exhaust passages 44 and 45 is made equal to that in the related art, since the flow rate per unit time of the compressed air which is exhausted from each of the exhaust passages 44 and 45 to the exhaust chamber 30 increases, the compressed air can be exhausted to the exhaust chamber 30 at an early stage and in an increased amount, whereby improvement in performance can be achieved.

Further, some of the compressed air which is supplied from the compressor 11 to the combustor 12 is bled from the combustor casing 38 and supplied to the respective ejectors 51 and 52 by the driving air supply passage 71. Therefore, a turbine cooling air (TCA) line (not shown) is connected from the combustor casing 38 to the compressor 11, and a base end portion of the driving air supply passage 71 is provided to branch off from the TCA line, whereby disposition of a pipe becomes easy, and the high-pressure compressed air can be easily supplied to the ejectors 51 and 52, so that the compressed air flowing through the respective exhaust passages 44 and 45 can be stably increased in speed.

Third Embodiment

Figure 4:
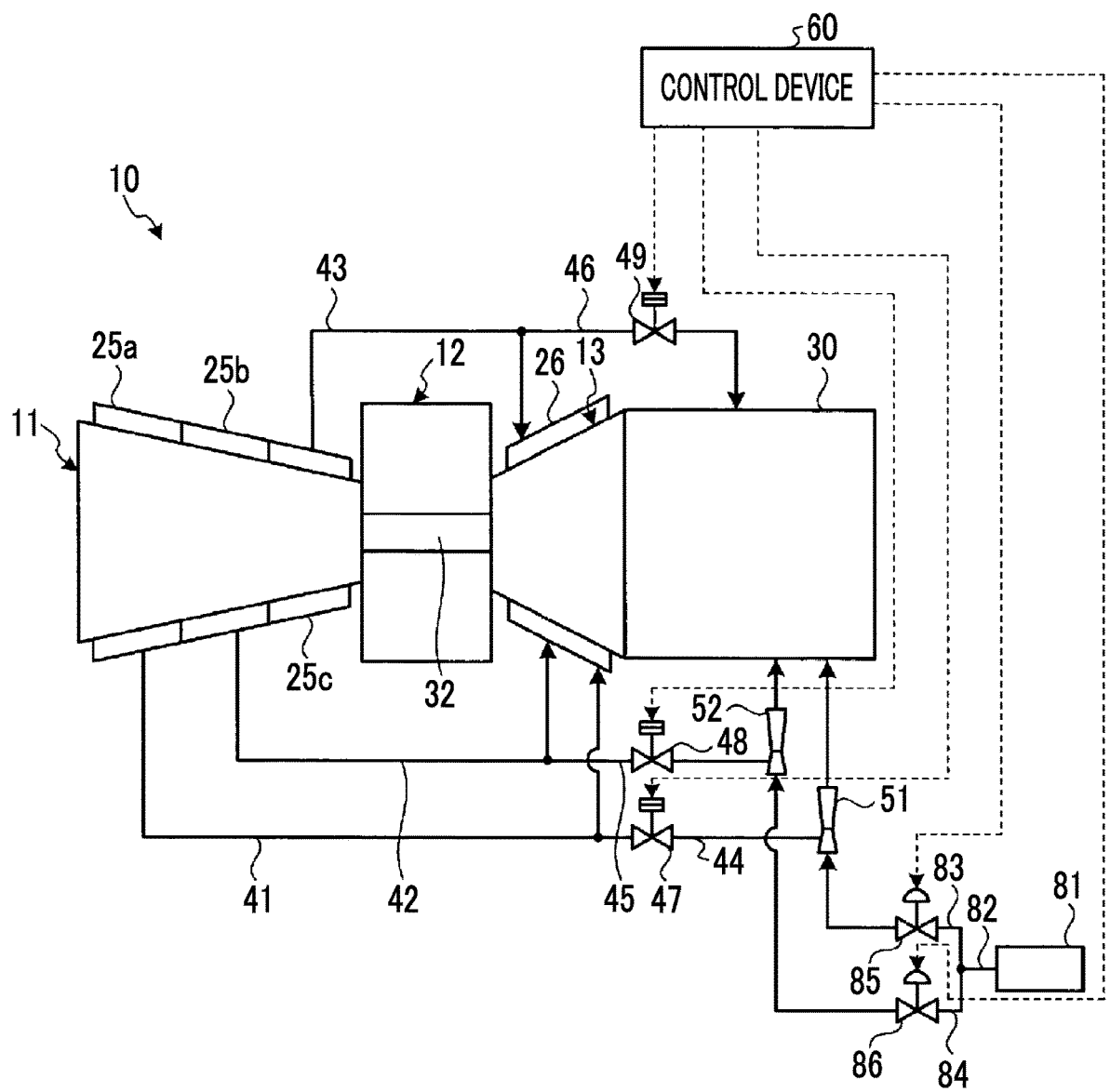
FIG. 4 is a schematic diagram showing a bleed system of a gas turbine of a third embodiment.

FIG. 4 is a schematic diagram showing a bleed system of a gas turbine of a third embodiment. Members having the same functions as those in the embodiments described above are denoted by the same reference numerals, and a detailed description thereof is omitted.

In the third embodiment, as shown in FIG. 4, the gas turbine 10 includes the compressor 11, the combustor 12, and the turbine 13. The configurations and operations of the low-pressure bleed passage 41, the medium-pressure bleed passage 42, the high-pressure bleed passage 43, the low-pressure exhaust passage 44, the medium-pressure exhaust passage 45, the high-pressure exhaust passage 46, the low-pressure exhaust valve 47, the medium-pressure exhaust valve 48, and the high-pressure exhaust valve 49 are the same as those in the first embodiment.

The low-pressure ejector 51 is disposed further on the downstream side in the flow direction of the compressed air than the low-pressure exhaust valve 47 in the low-pressure exhaust passage 44. The medium-pressure ejector 52 is disposed further on the downstream side in the flow direction of the compressed air than the medium-pressure exhaust valve 48 in the medium-pressure exhaust passage 45. Further, an external compressed air supply source (a driving fluid supply device) 81 which is provided outside is connected to a driving air supply passage 82, and the driving air supply passage 82 is branched into a low-pressure driving air supply passage 83 and a medium-pressure driving air supply passage 84. Then, the low-pressure driving air supply passage 83 is provided with a low-pressure flow regulation valve 85 and connected to the low-pressure ejector 51, and the medium-pressure driving air supply passage 84 is provided with a medium-pressure flow regulation valve 86 and connected to the medium-pressure ejector 52.

The low-pressure ejector 51 and the medium-pressure ejector 52 are two-phase flow ejectors, in which the driving air supply passages 83 and 84 are respectively connected to the respective supply ports, the downstream-side end portions of the exhaust passages 44 and 45 are respectively connected to the respective suction ports, and the respective exhaust ports are connected to the exhaust chamber 30. For this reason, if the respective flow regulation valves 85 and 86 are opened, the high-pressure compressed air from the external compressed air supply source 81 flows to the driving air supply passage 82 as a driving fluid and is supplied to the supply ports of the respective ejectors 51 and 52 through the respective driving air supply passages 83 and 84. Then, the compressed air in the respective exhaust passages 44 and 45 is suctioned from the suction ports into the ejectors 51 and 52, and the compressed air becomes a two-phase flow and is exhausted to the exhaust chamber 30 at an increased speed.

In the third embodiment, after the gas turbine 10 starts start-up and before the start-up state of the gas turbine 10 reaches the region where the rotating stall occurs, or at the time of starting of the start-up, the respective exhaust valves 47, 48, and 49 are opened and the respective flow regulation valves 85 and 86 are also opened in order to operate the respective ejectors 51 and 52. Further, if the start-up state of the gas turbine 10 comes out of the region where the rotating stall occurs, that is, if the rotational speed of the gas turbine 10 reaches a predetermined rotational speed (for example, a rated rotational speed) set in advance, the respective exhaust valves 47, 48, and 49 are closed, and the respective flow regulation valves 85 and 86 are also closed in order to stop the operation of the respective ejectors 51 and 52.

That is, if the control device 60 opens the low-pressure exhaust valve 47, the medium-pressure exhaust valve 48, and the high-pressure exhaust valve 49 at the time of the start-up of the gas turbine 10, the compressed air bled into the respective bleed chambers 25a, 25b, and 25c flows from the respective bleed passages 41, 42, and 43 into the respective exhaust passages 44, 45, and 46. Further, if the control device 60 opens the low-pressure flow regulation valve 85 and the medium-pressure flow regulation valve 86, the high-pressure compressed air in the external compressed air supply source 81 is supplied from the driving air supply passage 82 to the respective ejectors 51 and 52 through the respective driving air supply passages 83 and 84 to operate the respective ejectors 51 and 52. That is, in the low-pressure ejector 51, the high-pressure compressed air flowing inside draws the low-pressure compressed air flowing through the low-pressure exhaust passage 44, and the high-pressure compressed air and the low-pressure compressed air are mixed in the interior to form a two-phase flow, which is pushed out toward the exhaust chamber 30 to be exhausted to the exhaust chamber 30 at an increased speed. Further, in the medium-pressure ejector 52, the high-pressure compressed air flowing inside draws the medium-pressure compressed air flowing through the medium-pressure exhaust passage 45, and the high-pressure compressed air and the medium-pressure compressed air are mixed in the interior to form a two-phase flow, which is pushed out toward the exhaust chamber 30 to be exhausted to the exhaust chamber 30 at an increased speed.

In this manner, in the gas turbine of the third embodiment, the gas turbine includes: the low-pressure ejector 51 and the medium-pressure ejector 52 which are respectively provided in the low-pressure exhaust passage 44 and the medium-pressure exhaust passage 45; the external compressed air supply source 81 which supplies the compressed air as a driving fluid to the low-pressure ejector 51 and the medium-pressure ejector 52; and the control device 60 which opens the respective exhaust valves 47, 48, and 49 and supplies the compressed air from the external compressed air supply source 81 to the respective ejectors 51 and 52, when the operating state of the gas turbine 10 is in the region where the rotating stall occurs.

Therefore, when the start-up state of the gas turbine 10 is in a region reaching the region where the rotating stall occurs, the respective exhaust valves 47, 48, and 49 are opened and the compressed air in the external compressed air supply source 81 is supplied from the driving air supply passage 82 to the respective ejectors 51 and 52 to operate the respective ejectors 51 and 52. Then, some of the compressed air bled from the compressor 11 is increased in speed by the respective ejectors 51 and 52 and exhausted to the exhaust chamber 30. For this reason, the load on the compressor blades 24 is reduced, and thus the occurrence of the rotating stall is suppressed, so that the operating characteristics of the gas turbine 10 can be improved.

Further, in the gas turbine of the third embodiment, the compressed air from the external compressed air supply source 81 which is provided outside is supplied to the respective ejectors 51 and 52. Therefore, it is possible to supply the high-pressure compressed air to the ejectors 51 and 52 regardless of the operating state of the gas turbine 10, and thus it is possible to stably increase the speed of the compressed air flowing through the exhaust passages 44 and 45.

Fourth Embodiment

Figure 5:
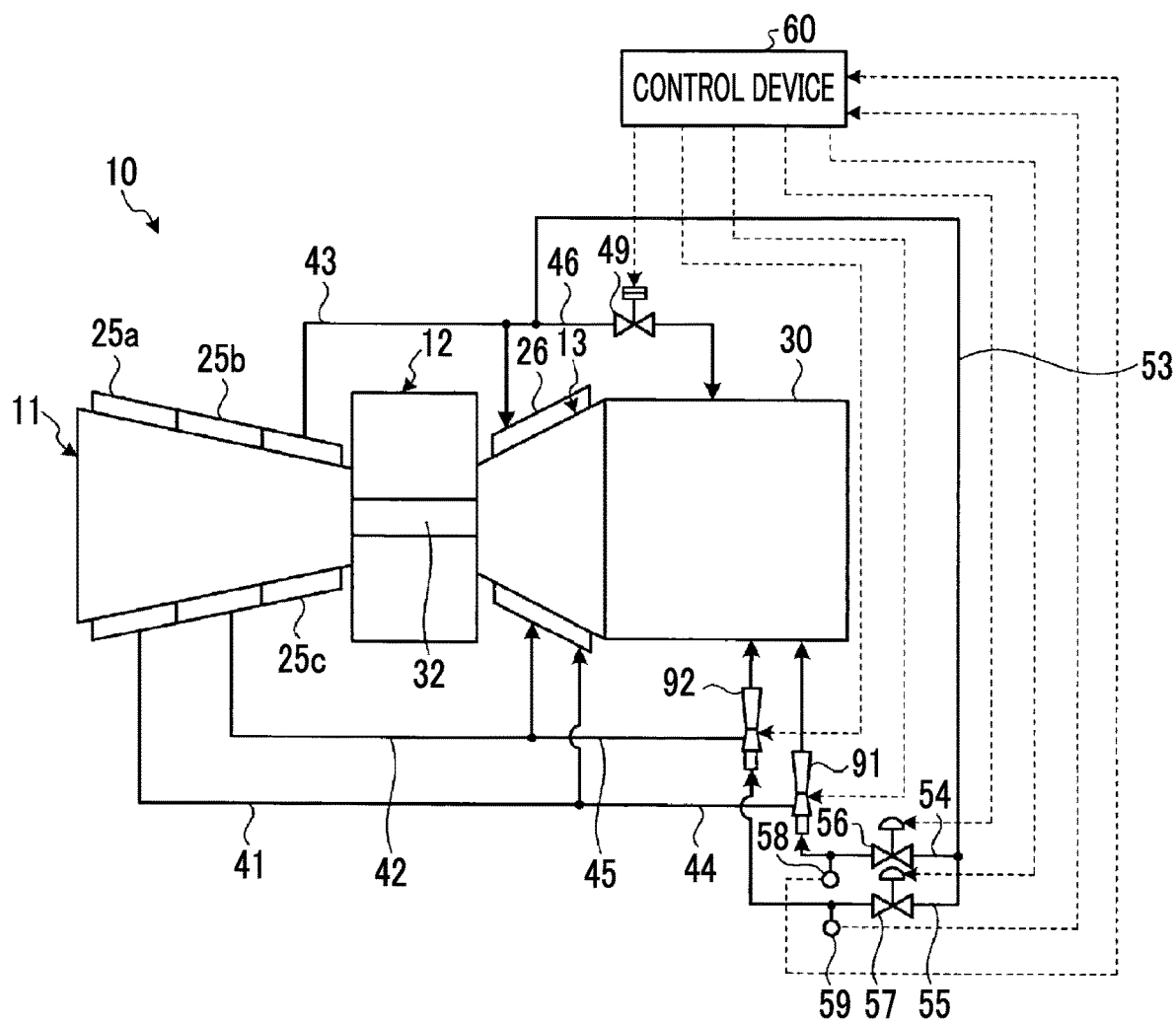
FIG. 5 is a schematic diagram showing a bleed system of a gas turbine of a fourth embodiment.
Figure 6:
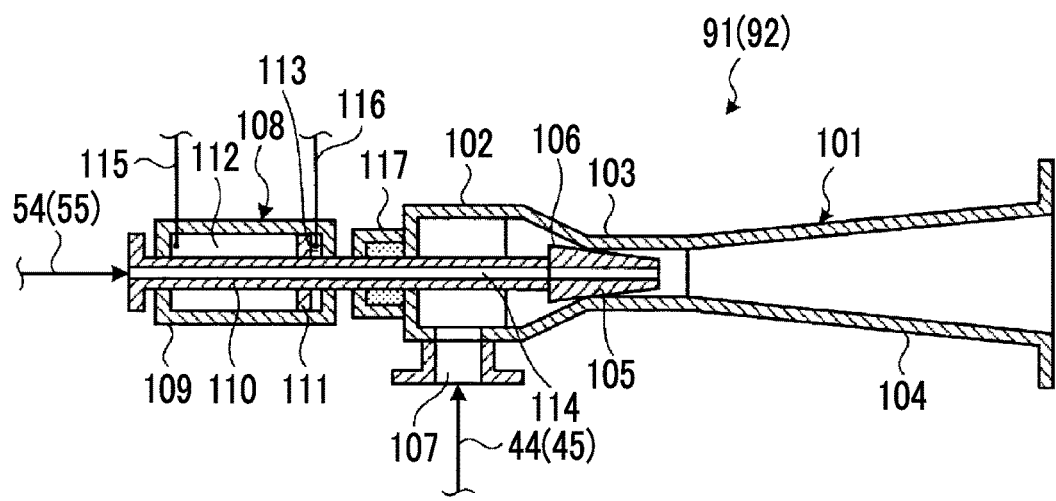
FIG. 6 is a sectional view showing an ejector.
Figure 7:
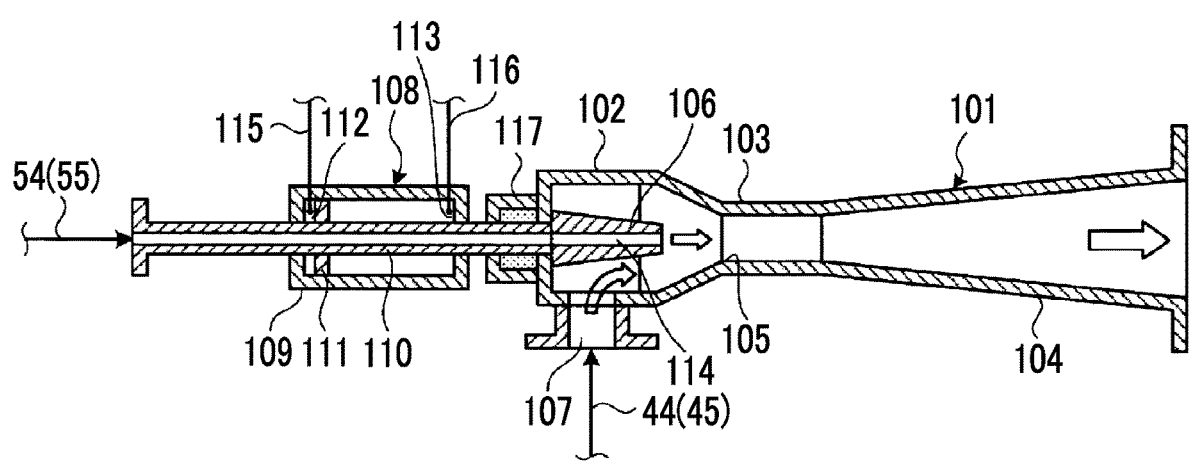
FIG. 7 is a sectional view showing an operation of the ejector.

FIG. 5 is a schematic diagram showing a bleed system of a gas turbine of a fourth embodiment, FIG. 6 is a sectional view showing an ejector, and FIG. 7 is a sectional view showing an operation of the ejector. Members having the same functions as those in the embodiments described above are denoted by the same reference numerals, and a detailed description thereof is omitted.

In the fourth embodiment, as shown in FIG. 5, the gas turbine 10 includes the compressor 11, the combustor 12, and the turbine 13. The configurations and operations of the low-pressure bleed passage 41, the medium-pressure bleed passage 42, the high-pressure bleed passage 43, the low-pressure exhaust passage 44, the medium-pressure exhaust passage 45, and the high-pressure exhaust valve 49 are the same as those in the first embodiment.

A low-pressure ejector 91 is disposed in the low-pressure exhaust passage 44, and a medium-pressure ejector 92 is disposed in the medium-pressure exhaust passage 45. In each of the low-pressure ejector 91 and the medium-pressure ejector 92, an exhaust valve is integrally provided. Further, one end portion of the driving air supply passage 53 is connected further to the upstream side in the flow direction of the compressed air than the high-pressure exhaust valve 49 in the high-pressure exhaust passage 46, and the other end portion is branched into the low-pressure driving air supply passage 54 and the medium-pressure driving air supply passage 55. Then, the low-pressure driving air supply passage 54 is provided with the low-pressure flow regulation valve 56 and connected to the low-pressure ejector 91. The medium-pressure driving air supply passage 55 is provided with the medium-pressure flow regulation valve 57 and connected to the medium-pressure ejector 92.

The low-pressure ejector 91 and the medium-pressure ejector 92 are two-phase flow ejectors, in which the driving air supply passages 54 and 55 are respectively connected to the respective supply ports, the downstream-side end portions of the exhaust passages 44 and 45 are respectively connected to the respective suction ports, and the respective exhaust ports are connected to the exhaust chamber 30.

In the ejector 91 (92), as shown in FIG. 6, an ejector main body 101 includes a suction section 102, a mixing section 103, and a diffuser 104, and a sealing portion 105 is provided in the mixing section 103. A nozzle (an exhaust valve) 106 is supported on the mixing section 103 so as to be movable in the axial direction, and an outer peripheral portion thereof is brought into close contact with the sealing portion 105, so that the suction section 102 and the diffuser 104 can be partitioned. Further, a suction port 107 is formed in the suction section 102, and the low-pressure exhaust passage (the medium-pressure exhaust passage 45) is connected thereto. An actuator 108 has a configuration in which a piston 111, to which a driving rod 110 is connected, is supported within a cylinder 109 so as to be movable in the axial direction, and two chambers 112 and 113 are defined in the interior thereof. The driving rod 110 penetrates the cylinder 109 in the axial direction, and a tip portion thereof is connected to the nozzle 106. In the nozzle 106 and the driving rod 110, a passage 114 is formed in the interior thereof, and the low-pressure driving air supply passage 54 (the medium-pressure driving air supply passage 55) is connected to a base end portion of the passage 114, and a tip portion of the passage 114 communicates with the interior of the mixing section 103. Further, in the actuator 108, working fluid passages 115 and 116 are respectively connected to the chambers 112 and 113. Further, a gland seal 117 is provided between the ejector main body 101 and the actuator 108. The actuator 108 is not limited to a fluid-driven type and may be an electric type.

For this reason, as shown in FIGS. 5 and 7, if the respective flow regulation valves 56 and 57 are opened, the high-pressure compressed air from the exhaust passage 46 flows to the driving air supply passage 53 as a driving fluid and is supplied to the supply ports of the respective ejectors 91 and 92 through the respective driving air supply passages 54 and 55. At this time, if the working fluid is supplied from the working fluid passage 116 to the chamber 113 of the actuator 108, the piston 111 and the driving rod 110 move in the axial direction, and thus the nozzle 106 which is in close contact with the sealing portion 105 is separated from the sealing portion 105. Then, the compressed air in the respective exhaust passage 44 and 45 is suctioned from the suction port 107 into the ejectors 91 and 92, and in the mixing section 103, the compressed air becomes a two-phase flow, which is increased in speed and exhausted from the diffuser 104 to the exhaust chamber 30.

In the fourth embodiment, before the start-up state of the gas turbine 10 reaches the region where the rotating stall occurs, or at the time of starting of the start-up, the exhaust valve 49 is opened and the respective actuators 108 are operated in order to operate the respective ejectors 91 and 92. Further, if the start-up state of the gas turbine 10 comes out of the region where the rotating stall occurs, that is, if the rotational speed of the gas turbine 10 reaches a predetermined rotational speed (for example, a rated rotational speed) set in advance, the exhaust valve 49 is closed and each actuator 108 is operated reversely in order to stop the operation of each of the ejectors 91 and 92.

That is, at the time of the start-up of the gas turbine 10, the compressed air bled into the respective bleed chambers 25a, 25b, and 25c flows from the respective bleed passages 41, 42, and 43 into the respective exhaust passages 44, 45, and 46. If the control device 60 opens the low-pressure flow regulation valve 56 and the medium-pressure flow regulation valve 57 and also operates each actuator 108, the high-pressure compressed air in the high-pressure exhaust passage 46 is supplied from the driving air supply passage 53 to the respective ejectors 91 and 92 through the respective driving air supply passages 54 and 55 to operate the respective ejectors 91 and 92. That is, in the low-pressure ejector 91, the high-pressure compressed air flowing inside draws the low-pressure compressed air flowing through the low-pressure exhaust passage 44, and the high-pressure compressed air and the low-pressure compressed air are mixed in the interior to form a two-phase flow, which is pushed out toward the exhaust chamber 30 to be exhausted to the exhaust chamber 30 at an increased speed. Further, in the medium-pressure ejector 92, the high-pressure compressed air flowing inside draws the medium-pressure compressed air flowing through the medium-pressure exhaust passage 45, and the high-pressure compressed air and the medium-pressure compressed air are mixed in the interior to form a two-phase flow, which is pushed out toward the exhaust chamber 30 to be exhausted to the exhaust chamber 30 at an increased speed.

In this manner, in the gas turbine of the fourth embodiment, the gas turbine includes: the low-pressure ejector 91 and the medium-pressure ejector 92 which are respectively provided in the low-pressure exhaust passage 44 and the medium-pressure exhaust passage 45; the driving air supply passage 53 for supplying the compressed air as a driving fluid to the low-pressure ejector 91 and the medium-pressure ejector 92; and the control device 60 which opens the exhaust valve 49 and supplies the compressed air from the driving air supply passage 53 to the respective ejectors 91 and 92, when the operating state of the gas turbine 10 is in the region where the rotating stall occurs.

Therefore, when the start-up state of the gas turbine 10 is in a region reaching the region where the rotating stall occurs, the exhaust valve 49 is opened and the compressed air is supplied to the respective ejectors 91 and 92 to operate the respective ejectors 91 and 92. Then, some of the compressed air bled from the compressor 11 is increased in speed by the respective ejectors 91 and 92 and exhausted to the exhaust chamber 30. For this reason, the load on the compressor blades 24 is reduced, and thus the occurrence of the rotating stall is suppressed, so that the operating characteristics of the gas turbine 10 can be improved.

Further, in the gas turbine of the fourth embodiment, in each of the low-pressure ejector 91 and the medium-pressure ejector 92, an exhaust valve is integrally provided. Therefore, the exhaust valve is integrally provided in each of the ejectors 91 and 92, whereby the exhaust valves of the exhaust passages 44 and 45 are eliminated, and thus it is possible to simplify the exhaust system for the compressed air and simplify the structure.

Fifth Embodiment

Figure 8:
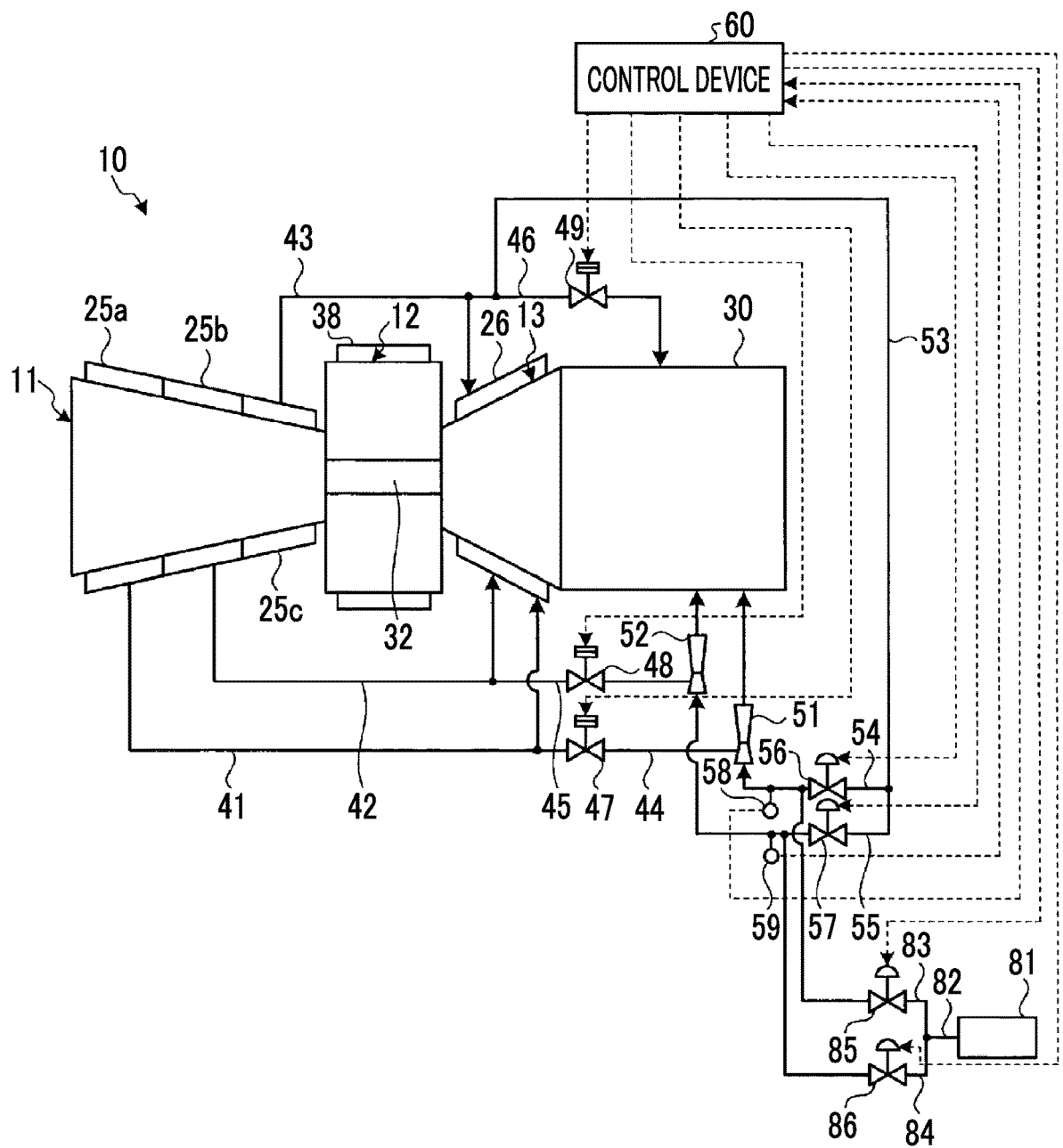
FIG. 8 is a schematic diagram showing a bleed system of a gas turbine of a fifth embodiment.

FIG. 8 is a schematic diagram showing a bleed system of a gas turbine of a fifth embodiment. Members having the same functions as those in the embodiments described above are denoted by the same reference numerals, and a detailed description thereof is omitted.

In the fifth embodiment, as shown in FIG. 8, the gas turbine 10 includes the compressor 11, the combustor 12, and the turbine 13. The configurations and operations of the low-pressure bleed passage 41, the medium-pressure bleed passage 42, the high-pressure bleed passage 43, the low-pressure exhaust passage 44, the medium-pressure exhaust passage 45, the high-pressure exhaust passage 46, the low-pressure exhaust valve 47, the medium-pressure exhaust valve 48, and the high-pressure exhaust valve 49 are the same as those in the first embodiment.

The low-pressure ejector 51 is disposed further on the downstream side in the flow direction of the compressed air than the low-pressure exhaust valve 47 in the low-pressure exhaust passage 44. The medium-pressure ejector 52 is disposed further on the downstream side in the flow direction of the compressed air than the medium-pressure exhaust valve 48 in the medium-pressure exhaust passage 45. One end portion of the driving air supply passage 53 is connected further to the upstream side in the flow direction of the compressed air than the high-pressure exhaust valve 49 in the high-pressure exhaust passage 46, and the other end portion thereof is branched into the low-pressure driving air supply passage 54 and the medium-pressure driving air supply passage 55. Then, the low-pressure driving air supply passage 54 is provided with the low-pressure flow regulation valve 56 and connected to the low-pressure ejector 51, and the medium-pressure driving air supply passage 55 is provided with the medium-pressure flow regulation valve 57 and connected to the medium-pressure ejector 52.

Further, the external compressed air supply source 81 which is provided outside is connected to the driving air supply passage 82, and the driving air supply passage 82 is branched into the low-pressure driving air supply passage 83 and the medium-pressure driving air supply passage 84. Then, the low-pressure driving air supply passage 83 is provided with the low-pressure flow regulation valve 85 and connected to the low-pressure ejector 51, and the medium-pressure driving air supply passage 84 is provided with the medium-pressure flow regulation valve 86 and connected to the medium-pressure ejector 52.

The low-pressure ejector 51 and the medium-pressure ejector 52 are two-phase flow ejectors, in which the driving air supply passages 54, 55, 83, and 84 are respectively connected to the respective supply ports, the downstream-side end portions of the exhaust passages 44 and 45 are respectively connected to the respective suction ports, and the respective exhaust ports are connected to the exhaust chamber 30. For this reason, if the respective flow regulation valves 56 and 57 are opened, the high-pressure compressed air bled into the high-pressure bleed chamber 25c flows from the high-pressure exhaust passage 46 to the driving air supply passage 53 and is supplied to the supply ports of the respective ejectors 51 and 52 through the respective driving air supply passages 54 and 55. Further, if the respective flow regulation valves 85 and 86 are opened, the high-pressure compressed air from the external compressed air supply source 81 flows to the driving air supply passage 82 and is supplied to the supply ports of the respective ejectors 51 and 52 through the respective driving air supply passages 83 and 84. Then, the compressed air in the respective exhaust passages 44 and 45 is suctioned from the suction ports into the ejectors 51 and 52, and the compressed air becomes a two-phase flow, and is exhausted to the exhaust chamber 30 at an increased speed.

In the fifth embodiment, a first driving fluid supply device which supplies the compressed air from the external compressed air supply source 81 which is provided outside the compressor 11 and the combustor casing 38 to the respective ejectors 51 and 52, and a second driving fluid supply device which supplies the compressed air from the high-pressure bleed chamber 25c (an internal compressed air supply source) which is provided inside the compressor 11 or the compressed air from the interior (an internal compressed air supply source) of the combustor casing 38 to the respective ejectors 51 and 52 are provided. The control device 60 operates the first driving fluid supply device and stops the second driving fluid supply device, at the time of the start-up of the gas turbine 10, and stops the first driving fluid supply device and operates the second driving fluid supply device, if the rotational speed of the gas turbine 10 reaches a predetermined rotational speed set in advance.

After the gas turbine 10 starts start-up and before the start-up state of the gas turbine 10 reaches the region where the rotating stall occurs, or at the time of starting of the start-up, the respective exhaust valves 47, 48, and 49 are opened and the respective flow regulation valves 56, 57, 85, and 86 are also opened in order to operate the respective ejectors 51 and 52. Further, if the start-up state of the gas turbine 10 comes out of the region where the rotating stall occurs, that is, if the rotational speed of the gas turbine 10 reaches a predetermined rotational speed (for example, a rated rotational speed) set in advance, the respective exhaust valves 47, 48, and 49 are closed and the respective flow regulation valves 56, 57, 85, and 86 are also closed in order to stop the operation of the respective ejectors 51 and 52.

That is, at the time of starting of the start-up of the gas turbine 10, the compressor 11 and the interior of the combustor casing 38 are at atmospheric pressure, and the control device 60 opens the low-pressure exhaust valve 47, the medium-pressure exhaust valve 48, and the high-pressure exhaust valve 49 and also opens the low-pressure flow regulation valve 85 and the medium-pressure flow regulation valve 86. Then, the high-pressure compressed air of the external compressed air supply source 81 is supplied from the driving air supply passage 82 to the respective ejectors 51 and 52 through the respective driving air supply passages 83 and 84 to operate the respective ejectors 51 and 52. That is, in the low-pressure ejector 51, the high-pressure compressed air flowing inside draws the compressed air in the low-pressure exhaust passage 44, and the high-pressure compressed air and the compressed air are mixed in the interior to form a two-phase flow, which is pushed out toward the exhaust chamber 30 to be exhausted to the exhaust chamber 30 at an increased speed. Further, in the medium-pressure ejector 52, the high-pressure compressed air flowing inside draws the compressed air in the medium-pressure exhaust passage 45, and the high-pressure compressed air and the medium-pressure compressed air are mixed in the interior to form a two-phase flow, which is pushed out toward the exhaust chamber 30 to be exhausted to the exhaust chamber 30 at an increased speed.

Then, if the rotational speed of the gas turbine 10 reaches a predetermined rotational speed, the compressed air bled into the respective bleed chambers 25a, 25b, and 25c flows from the respective bleed passages 41, 42, and 43 into the respective exhaust passages 44, 45, and 46. At this time, if the control device 60 closes the low-pressure flow regulation valve 85 and the medium-pressure flow regulation valve 86 and opens the low-pressure flow regulation valve 56 and the medium-pressure flow regulation valve 57, the high-pressure compressed air in the high-pressure exhaust passage 46 is supplied from the driving air supply passage 53 to the respective ejectors 51 and 52 through the respective driving air supply passages 54 and 55 to operate to the respective ejectors 51 and 52. That is, in the low-pressure ejector 51, the high-pressure compressed air flowing inside draws the low-pressure compressed air flowing through the low-pressure exhaust passage 44, and the high-pressure compressed air and the low-pressure compressed air are mixed in the interior to form a two-phase flow, which is pushed out toward the exhaust chamber 30 to be exhausted to the exhaust chamber 30 at an increased speed. Further, in the medium-pressure ejector 52, the high-pressure compressed air flowing inside draws the medium-pressure compressed air flowing through the medium-pressure exhaust passage 45, and the high-pressure compressed air and the medium-pressure compressed air are mixed in the interior to form a two-phase flow, which is pushed out toward the exhaust chamber 30 to be exhausted to the exhaust chamber 30 at an increased speed.

That is, at the time of starting of the start-up of the gas turbine 10, since the compressor 11 and the interior of the combustor casing 38 are at the atmospheric pressure, the high-pressure compressed air of the external compressed air supply source 81 is used as a driving fluid for each of the ejectors 51 and 52, and if the rotational speed of the gas turbine 10 reaches a predetermined rotational speed, since the pressure of the compressed air in each of the bleed chambers 25a, 25b, and 25c and the combustor casing 38 rises, the high-pressure compressed air in the bleed chamber 25c is used as a driving fluid for each of the ejectors 51 and 52.

The internal compressed air supply source of the second driving fluid supply device is not limited to the respective bleed chambers 25a, 25b, and 25c and may be the combustor casing 38 applied in the second embodiment.

In this manner, in the gas turbine of the fifth embodiment, the first driving fluid supply device which supplies the compressed air from the external compressed air supply source 81 which is provided outside the compressor 11 and the combustor casing 38 to the respective ejectors 51 and 52, and the second driving fluid supply device which supplies the compressed air from the respective bleed chambers 25a, 25b, and 25c which is provided inside the compressor 11 to the ejectors 51 and 52 are provided, and the control device 60 supplies the compressed air from the external compressed air supply source 81 to the ejectors 51 and 52 at the time of the start-up, and supplies the compressed air from the respective bleed chambers 25a, 25b, and 25c to the ejectors 51 and 52 when reaching a predetermined rotational speed.

Therefore, the occurrence of the rotating stall can be suppressed by operating the ejectors 51 and 52 at all times regardless of the operating state of the gas turbine 10.

Sixth Embodiment

Figure 9:
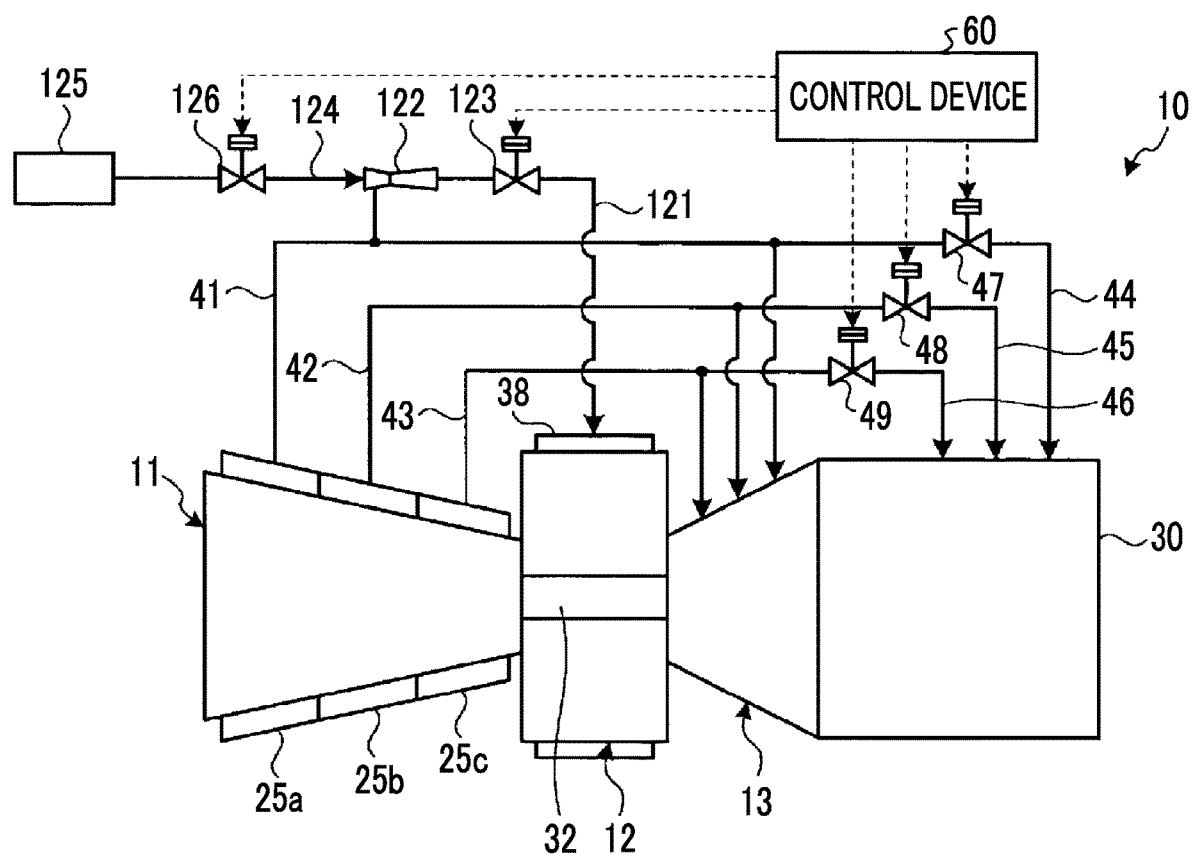
FIG. 9 is a schematic diagram showing a bleed system of a gas turbine of a sixth embodiment.

FIG. 9 is a schematic diagram showing a bleed system of a gas turbine of a sixth embodiment. Members having the same functions as those in the embodiments described above are denoted by the same reference numerals, and a detailed description thereof is omitted.

In the sixth embodiment, as shown in FIG. 9, the gas turbine 10 includes the compressor 11, the combustor 12, and the turbine 13. The configurations and operations of the low-pressure bleed passage 41, the medium-pressure bleed passage 42, the high-pressure bleed passage 43, the low-pressure exhaust passage 44, the medium-pressure exhaust passage 45, the high-pressure exhaust passage 46, the low-pressure exhaust valve 47, the medium-pressure exhaust valve 48, and the high-pressure exhaust valve 49 are the same as those in the first embodiment.

A cooling air passage 121 is connected, at a base end portion thereof, to the bleed passage 41 which is connected to the bleed chamber 25a, and is connected, at a tip portion thereof, to the upper portion of the combustor casing 38. An ejector for cooling air 122 is provided in the cooling air passage 121, and an on-off valve 123 is provided on the downstream side of the ejector for cooling air 122 in the flow direction of cooling air. A driving air supply passage for cooling air (a driving fluid supply passage for cooling air) 124 is connected, at a base end portion thereof, to an external compressed air supply source (a driving fluid supply device for cooling air) 125 which is provided outside, and is connected, at a tip portion thereof, to the ejector for cooling air 122, and an on-off valve 126 is provided in the driving air supply passage for cooling air 124. The ejector for cooling air 122 is a two-phase flow ejector, in which the driving air supply passage for cooling air 124 is connected to the supply port, the cooling air passage 121 is connected to the suction port, and the exhaust port is connected to the upper portion of the combustor casing 38. For this reason, if the on-off valve 126 is opened, the compressed air from the external compressed air supply source 125 is supplied to the supply port of the ejector for cooling air 122 through the driving air supply passage for cooling air 124 as a driving fluid. Then, air bled from the bleed chamber 25a, which has reached the atmospheric pressure, is suctioned from the suction port into the ejector for cooling air 122 through the cooling air passage 121, and the compressed air becomes a two-phase flow and is supplied to the upper portion of the combustor casing 38 at an increased speed.

In the sixth embodiment, after the gas turbine 10 stops, the on-off valve 123 of the cooling air passage 121 is opened and the on-off valve 126 is also opened in order to operate the ejector for cooling air 122. Further, if a predetermined time elapses after the gas turbine 10 has stopped, the on-off valve 123 of the cooling air passage 121 is closed and the on-off valve 126 is also closed in order to stop the operation of the ejector for cooling air 122.

That is, even if the gas turbine 10 stops, the compressor 11, the combustor 12, and the turbine 13 are in a high-temperature state. If the respective on-off valves 123 and 126 are opened after the gas turbine 10 stops, the compressed air from the external compressed air supply source 125 is supplied to the ejector for cooling air 122 through the driving air supply passage for cooling air 124 to operate the ejector for cooling air 122. That is, the air bled into the bleed chamber 25a flows from the low-pressure bleed passage 41 to the ejector for cooling air 122 through the cooling air passage 121, and in the ejector for cooling air 122, the high-pressure compressed air supplied from the external compressed air supply source 125 and flowing inside draws the air flowing through the low-pressure bleed passage 41, and the high-pressure compressed air and the air are mixed in the interior to form a two-phase flow, which is supplied to the upper portion of the combustor casing 38. For this reason, the combustor casing 38 is cooled and stirred by the compressed air supplied to the upper portion, and thus a temperature difference between the upper portion and the lower portion is reduced. It is favorable if the air flowing through the low-pressure bleed passage 41, which the ejector for cooling air 122 draws in, has a lower pressure than the compressed air which is supplied from the external compressed air supply source 125.

In this manner, in the gas turbine of the sixth embodiment, the cooling air passage 121 for supplying cooling air to the upper portion of the combustor casing 38, the ejector for cooling air 122 and the on-off valve 123 which are provided in the cooling air passage 121, and the external compressed air supply source 125 which supplies compressed air as a driving fluid to the ejector for cooling air 122 through the driving air supply passage for cooling air 124 are provided, and the control device 60 operates the external compressed air supply source 125 and also opens the respective on-off valves 123 and 126, after stopping of the gas turbine 10.

Therefore, after stopping of the gas turbine 10, the compressed air is supplied from the external compressed air supply source 125 to the ejector for cooling air 122 to operate the ejector for cooling air 122, whereby the compressed air for cooling flowing through the cooling air passage 121 is increased in speed by the ejector for cooling air 122 and supplied to the upper portion of the combustor casing 38. For this reason, after stopping of the gas turbine 10, the upper space in the combustor casing 38 can be stirred and cooled by the cooling air, and thus a temperature difference between the upper and lower portions of the casing can be reduced, so that deformation can be suppressed. Further, an electric fan or the like for cooling is not needed separately, and thus an equipment cost can be reduced.

In the first to fifth embodiments described above, a configuration is made such that before the start-up state of the gas turbine 10 reaches the region where the rotating stall occurs, or at the time of starting of the start-up, the respective exhaust valves 47, 48, and 49 are opened and the respective ejectors 51 and 52 are operated. However, a timing at which the respective exhaust valves 47, 48, and 49 are opened and the respective ejectors 51 and 52 are operated may be set such that the exhaust valves 47, 48, and 49 are opened before the gas turbine 10 is started, or the timing may be set such that a rotational speed at which the gas turbine 10 generates a rotating stall, the pressure of the compressed air, or the like is obtained in advance through experiments or the like and the exhaust valves are opened when the gas turbine 10 is started and then reaches the rotational speed at which the rotating stall occurs, or the pressure of the compressed air. Further, a configuration is made such that if the rotational speed of the gas turbine 10 becomes equal to or higher than a predetermined rotational speed at which the rotating stall does not occur, the respective exhaust valves 47, 48, and 49 are closed and the respective flow regulation valves 56 and 57 are also closed to stop the operation of the respective ejectors 51 and 52. However, the predetermined rotational speed may be a rated rotational speed, may be a rotational speed lower than the predetermined rotational speed, or may be obtained by experiments or the like in advance.

Further, in the first to fifth embodiments described above, the control of the respective exhaust valves 47, 48, and 49 and the respective ejectors 51 and 52 at the time of the start-up of the gas turbine 10 has been described. However, the same control may be performed at the time of the stopping of the gas turbine 10. That is, a configuration may be made such that at the time of the stopping of the gas turbine 10, before the stopped state of the gas turbine 10 reaches the region where the rotating stall occurs, that is, if the rotational speed of the gas turbine 10 becomes lower than a predetermined rotational speed (for example, a rated rotational speed or a rotational speed lower than the rated rotational speed) at which the rotating stall occurs, the respective exhaust valves 47, 48, and 49 are opened and the respective ejectors 51 and 52 are operated. The predetermined rotational speed may be obtained through experiments or the like in advance. The time of the start-up of the gas turbine refers to a period of time after the gas turbine starts start-up and until the gas turbine reaches a rated operating state. Further, the time of the stopping of the gas turbine refers to a period of time from the rated operating state to the stopped state of the gas turbine.

REFERENCE SIGNS LIST

11: compressor
12: combustor
13: turbine
21: compressor casing
23: compressor vane
24: compressor blade
25: bleed chamber (internal compressed air supply source)
26: turbine casing
30: exhaust chamber (turbine exhaust system)
32: rotor
38: combustor casing (internal compressed air supply source)
41: low-pressure bleed passage (first bleed passage)
42: medium-pressure bleed passage (first bleed passage)
43: high-pressure bleed passage (second bleed passage)
44: low-pressure exhaust passage (first exhaust passage)
45: medium-pressure exhaust passage (first exhaust passage)
46: high-pressure exhaust passage (second exhaust passage)
47: low-pressure exhaust valve (first exhaust valve)
48: medium-pressure exhaust valve (first exhaust valve)
49: high-pressure exhaust valve (second exhaust valve)
51, 91: low-pressure ejector
52, 92: medium-pressure ejector
53, 71, 82: driving air supply passage (driving fluid supply passage, driving fluid supply device)
54, 72, 83: low-pressure driving air supply passage (driving fluid supply passage, driving fluid supply device)
55, 73, 84: medium-pressure driving air supply passage (driving fluid supply passage, driving fluid supply device)
56, 74, 85: low-pressure flow regulation valve (driving fluid supply device)
57, 75, 86: medium-pressure flow regulation valve (driving fluid supply device)
58, 59: pressure detector
60: control device
81: external compressed air supply source (driving fluid supply device)
101: ejector main body
102: suction section
103: mixing section
104: diffuser
105: sealing portion
106: nozzle (exhaust valve)
108: actuator
114: passage
121: cooling air passage
122: ejector for cooling air
123, 126: on-off valve
124: driving air supply passage for cooling air
125: external compressed air supply source (driving fluid supply device for cooling air)

The invention claimed is:

1. A gas turbine which includes a compressor, a combustor, and a turbine, the gas turbine comprising:
a bleed passage for supplying compressed air bled from the compressor to the turbine as cooling air;
an exhaust chamber on a downstream side of the turbine;
an exhaust passage for exhausting the compressed air in the bleed passage to the exhaust chamber;
an exhaust valve which is in the exhaust passage;
an ejector which is further on the downstream side in a flow direction of the compressed air than the exhaust valve in the exhaust passage, the ejector being directly connected to the exhaust chamber;
a driving fluid supply device which is configured to supply a driving fluid to the ejector;

a control device which is configured to open the exhaust valve and operate the driving fluid supply device, at a time of start-up or stopping of the gas turbine; and
a pressure detector which is configured to detect a pressure of the compressed air flowing through the exhaust passage or a pressure of the driving fluid which is supplied to the ejector by the driving fluid supply device,
wherein:
the control device is configured to control an operation of the driving fluid supply device, based on a detection result of the pressure detector;
the driving fluid supply device includes a driving fluid supply passage for supplying the driving fluid to the ejector, and a flow regulation valve which is in the driving fluid supply passage; and
the control device is configured to control a degree of opening of the flow regulation valve, based on the detection result of the pressure detector.

2. The gas turbine according to claim 1, wherein the control device is configured to open the exhaust valve and operate the driving fluid supply device, when an operating state of the gas turbine is in a region where a rotating stall occurs.

3. The gas turbine according to claim 1, wherein the control device is configured to open the exhaust valve and operate the driving fluid supply device, at the time of start-up of the gas turbine, and close the exhaust valve and stop the operation of the driving fluid supply device, during a start-up state of the gas turbine that comes out of a predetermined rotational speed where a rotating stall occurs.

4. The gas turbine according to claim 1, wherein the control device is configured to close the exhaust valve and stop the operation of the driving fluid supply device, during an operating state of the gas turbine when a rotational speed of the gas turbine becomes equal to or higher than a predetermined rotational speed at which a rotating stall does not occur.

5. The gas turbine according to claim 1, wherein the pressure of the driving fluid is higher than the pressure of the compressed air flowing through the exhaust passage to the ejector.

6. The gas turbine according to claim 1, wherein the driving fluid is the compressed air which is supplied from the compressor to the combustor to the ejector.

7. The gas turbine according to claim 1, wherein the driving fluid is compressed air supplied from a compressed air supply source which is outside the compressor and a casing of the combustor to the ejector.

8. The gas turbine according to claim 1, wherein:
the driving fluid supply device includes a first driving fluid supply device which is configured to supply compressed air from an external compressed air supply source which is outside the compressor and a casing of the combustor to the ejector, and a second driving fluid supply device which is configured to supply compressed air from an internal compressed air supply source which is inside the compressor or the combustor to the ejector; and
the control device is configured to operate the first driving fluid supply device and stop the second driving fluid supply device, at the time of start-up of the gas turbine, and stop the first driving fluid supply device and operate the second driving fluid supply device, during an operating state of the gas turbine when a rotational speed of the gas turbine reaches a predetermined rotational speed set in advance.

9. The gas turbine according to claim 1, wherein the exhaust valve is integrally provided in the ejector.

10. The gas turbine according to claim 1, wherein:
the ejector is a first ejector;
the driving fluid supply device is a first driving fluid supply device; and
the gas turbine further comprises:
a cooling air passage for supplying the cooling air to an upper portion of a casing of the combustor;
an on-off valve which is in the cooling air passage;
a second ejector for cooling air which is in the cooling air passage; and
a second driving fluid supply device for cooling air which is configured to supply a driving fluid to the second ejector for cooling air; and
the control device is configured to open the on-off valve and operate the second driving fluid supply device for cooling air, after the stopping of the gas turbine.

11. A gas turbine which includes a compressor, a combustor, and a turbine, the gas turbine comprising:
a bleed passage for supplying compressed air bled from the compressor to the turbine as cooling air;
an exhaust chamber on a downstream side of the turbine;
an exhaust passage for exhausting the compressed air in the bleed passage to the exhaust chamber;
an exhaust valve which is in the exhaust passage;
an ejector which is further on the downstream side in a flow direction of the compressed air than the exhaust valve in the exhaust passage, the ejector being directly connected to the exhaust chamber;
a driving fluid supply device which is configured to supply a driving fluid to the ejector; and
a control device which is configured to open the exhaust valve and operate the driving fluid supply device, at a time of start-up or stopping of the gas turbine,
wherein:
the bleed passage is one of a first bleed passage and a second bleed passage included in the gas turbine;
the first bleed passage is configured to supply compressed air bled from a first bleed chamber of the compressor to the turbine as the cooling air;
the second bleed passage is configured to supply compressed air bled from a second bleed chamber of the compressor to the turbine as the cooling air;
the second bleed chamber is further on a high-pressure side than the first bleed chamber;
the exhaust passage is one of a first exhaust passage and a second exhaust passage included in the gas turbine;
the first exhaust passage is configured to exhaust the compressed air in the first bleed passage to the exhaust chamber;
the second exhaust passage is configured to exhaust the compressed air in the second bleed passage to the exhaust chamber;
the ejector is in the first exhaust passage; and
the driving fluid supply device is configured to supply the compressed air flowing through the second exhaust passage to the ejector.

\* \* \* \* \*